United States Patent
Ravindhran et al.

(10) Patent No.: US 10,140,121 B2
(45) Date of Patent: Nov. 27, 2018

(54) SENDING A COMMAND WITH CLIENT INFORMATION TO ALLOW ANY REMOTE SERVER TO COMMUNICATE DIRECTLY WITH CLIENT

(71) Applicant: Oracle International Corporation, Redwood Shores, CA (US)

(72) Inventors: Sampath Ravindhran, Fremont, CA (US); Jonathan Creighton, Oakland, CA (US); Khethavath Param Singh, Cupertino, CA (US); Kannabran Viswanathan, Foster City, CA (US); Soo Huey Wong, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 14/805,428

(22) Filed: Jul. 21, 2015

(65) Prior Publication Data
US 2017/0026448 A1 Jan. 26, 2017

(51) Int. Cl.
*H04L 29/08* (2006.01)
*H04L 29/06* (2006.01)
(Continued)

(52) U.S. Cl.
CPC .............. *G06F 9/00* (2013.01); *G06F 17/30* (2013.01); *H04L 29/06095* (2013.01); *H04L 67/2833* (2013.01)

(58) Field of Classification Search
CPC ......... H04L 67/02; H04L 67/34; H04L 67/42; H04L 29/06095; H04L 67/2833;
(Continued)

(56) References Cited

U.S. PATENT DOCUMENTS

| 5,825,752 A | * | 10/1998 | Fujimori ........... H04L 12/40058 370/260 |
| 5,987,463 A | | 11/1999 | Draaijer |

(Continued)

OTHER PUBLICATIONS

Oracle® Fusion Middleware, Understanding Oracle WebLogic Server, 12c Release 1 (12.1.1), E24446-03 Nov. 2013.
(Continued)

*Primary Examiner* — Chris Parry
*Assistant Examiner* — Soe M Hlaing
(74) *Attorney, Agent, or Firm* — Omkar K. Suryadevara; Silicon Valley Patent Group LLP

(57) ABSTRACT

A process that executes client software in a computer, hereinafter client process, starts execution of at least a portion of server software, hereinafter listener. The client process retrieves from the listener, an identifier of a port in the computer, at which the listener waits to receive one or more messages, which may contain commands. The client process connects to a server process in another computer and sends only to the server process, at least a command and client information that includes at least the port identifier of its listener. Any remote computer(s) that may receive and execute the command, use the client information to send back information related to the command, directly to the port identifier of the listener started by the client process. Any messages received at the listener's port identifier are processed, e.g. by displaying any output generated in execution of the command by the remote computer(s).

21 Claims, 16 Drawing Sheets

(51) Int. Cl.
*G06F 9/00* (2006.01)
*G06F 17/30* (2006.01)

(58) Field of Classification Search
CPC ... H04L 12/2872; H04L 12/2856; G06F 9/00; G06F 17/30
See application file for complete search history.

(56) References Cited

U.S. PATENT DOCUMENTS

| | | | |
|---|---|---|---|
| 6,401,109 B1* | 6/2002 | Heiney | G06F 9/54 718/1 |
| 6,493,750 B1* | 12/2002 | Mathew | G06F 13/387 709/200 |
| 6,622,159 B1* | 9/2003 | Chao | G06F 8/67 709/203 |
| 6,912,588 B1* | 6/2005 | Jardin | H04L 29/06 709/238 |
| 7,167,486 B2 | 1/2007 | Cornelius | |
| 7,783,755 B2* | 8/2010 | Goss | H04L 29/06 709/225 |
| 7,912,922 B2 | 3/2011 | Itikarlapalli | |
| 7,921,076 B2 | 4/2011 | Hoang | |
| 8,285,672 B2 | 10/2012 | Wells | |
| 8,549,122 B2 | 10/2013 | Azulai | |
| 8,584,143 B2 | 11/2013 | de Lavarene | |
| 8,732,191 B2 | 5/2014 | Somogyi | |
| 8,849,910 B2 | 9/2014 | Inamdar | |
| 8,856,352 B2 | 10/2014 | Revanuru | |
| 2002/0116523 A1* | 8/2002 | Warrier | H04L 29/12009 709/238 |
| 2004/0243578 A1 | 12/2004 | Chan | |
| 2005/0033985 A1* | 2/2005 | Xu | H04L 63/029 726/4 |
| 2006/0037016 A1* | 2/2006 | Saha | G06F 8/61 717/178 |
| 2008/0184276 A1 | 7/2008 | Jong | |
| 2008/0250121 A1 | 10/2008 | Thirumalai | |
| 2008/0289019 A1 | 11/2008 | Lam | |
| 2009/0070792 A1 | 3/2009 | Cable | |
| 2009/0233596 A1* | 9/2009 | Calabrese | H04W 4/18 455/426.1 |
| 2012/0066363 A1 | 3/2012 | Somogyi | |
| 2013/0239004 A1 | 9/2013 | Bihani | |
| 2014/0095644 A1 | 4/2014 | Dharmalingam | |
| 2014/0280988 A1 | 9/2014 | Reynolds | |

OTHER PUBLICATIONS

Oracle® Containers for J2EE, Developer's Guide, 10g (10.1.3.5.0), E13979-01, Jul. 2009.
Oracle® Clusterware, Administration and Deployment Guide, 11g Release 2 (11.2), E41959-03 Aug. 2013.
Oracle® Application Server, Administrator's Guide, 10g Release 3 (10.1.3.2.0), B32196-01 Jan. 2007.

* cited by examiner

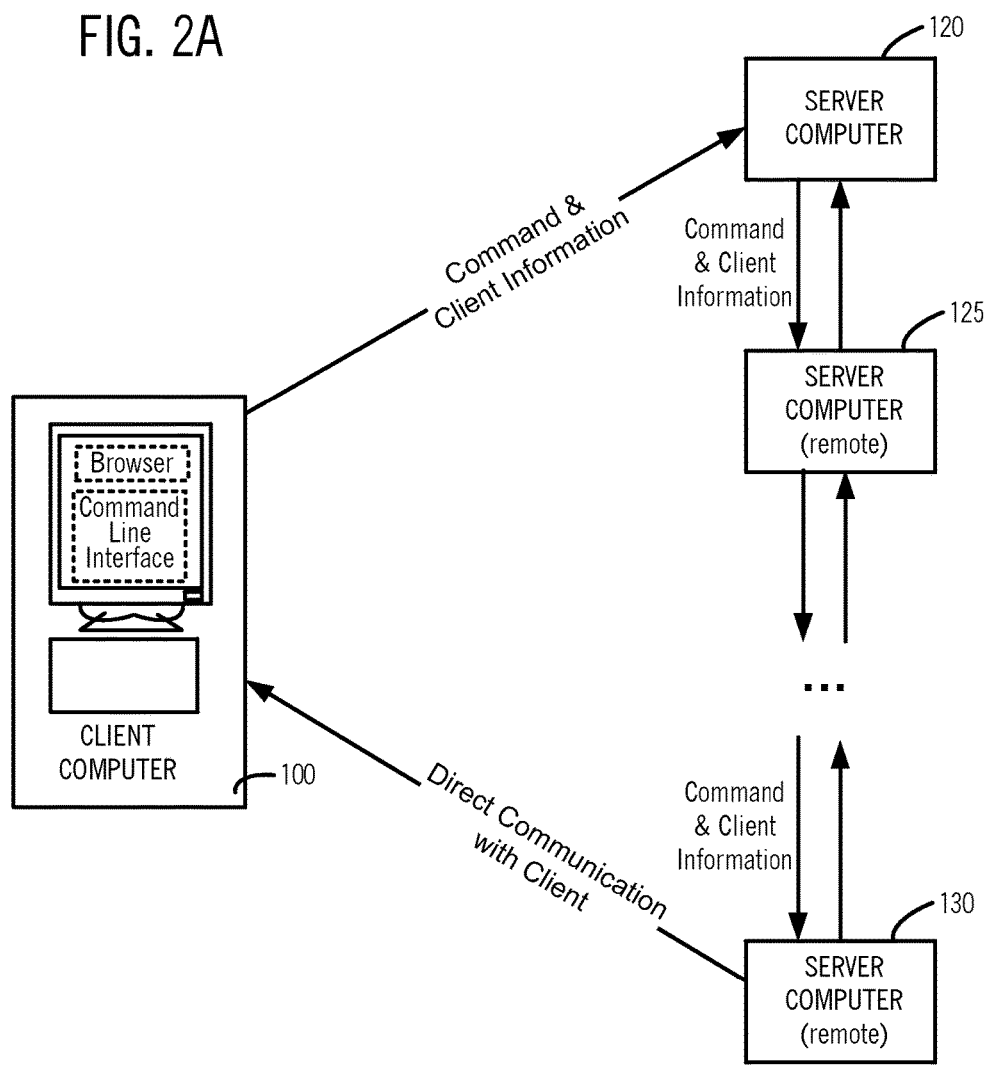

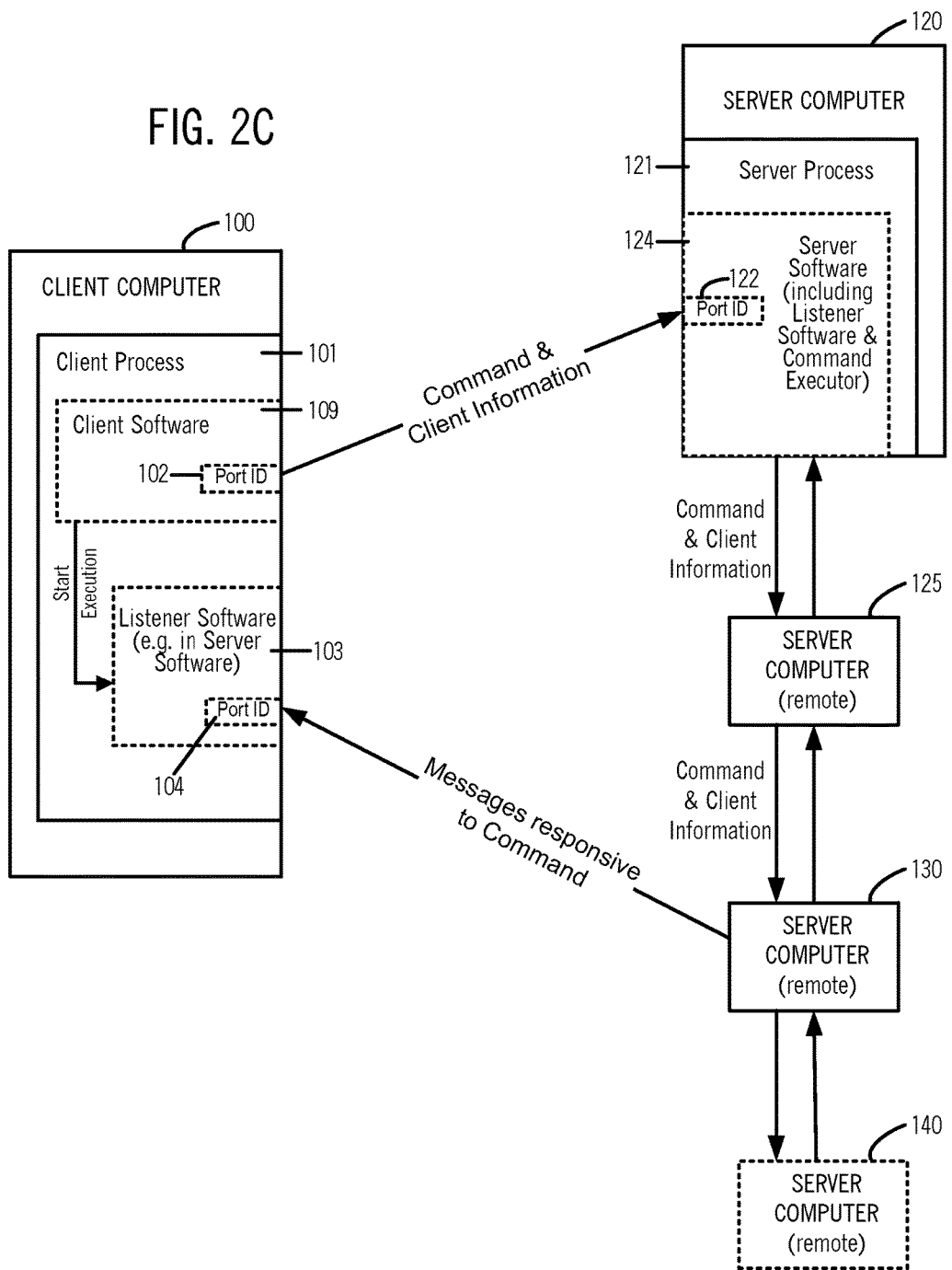

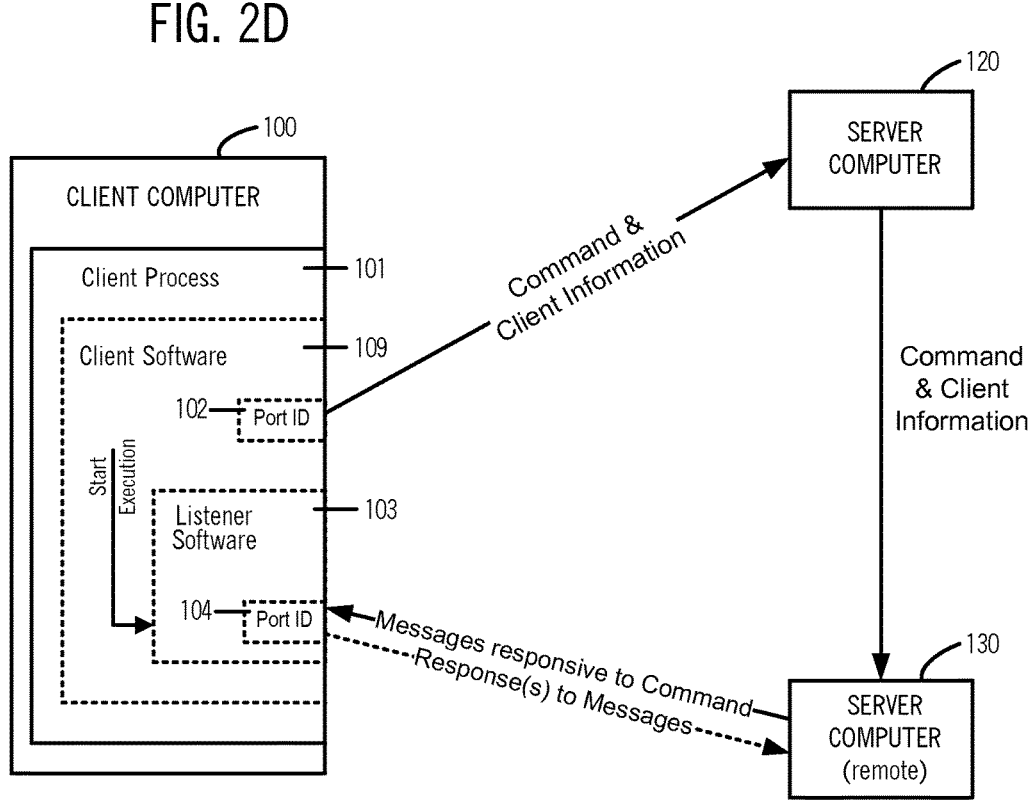

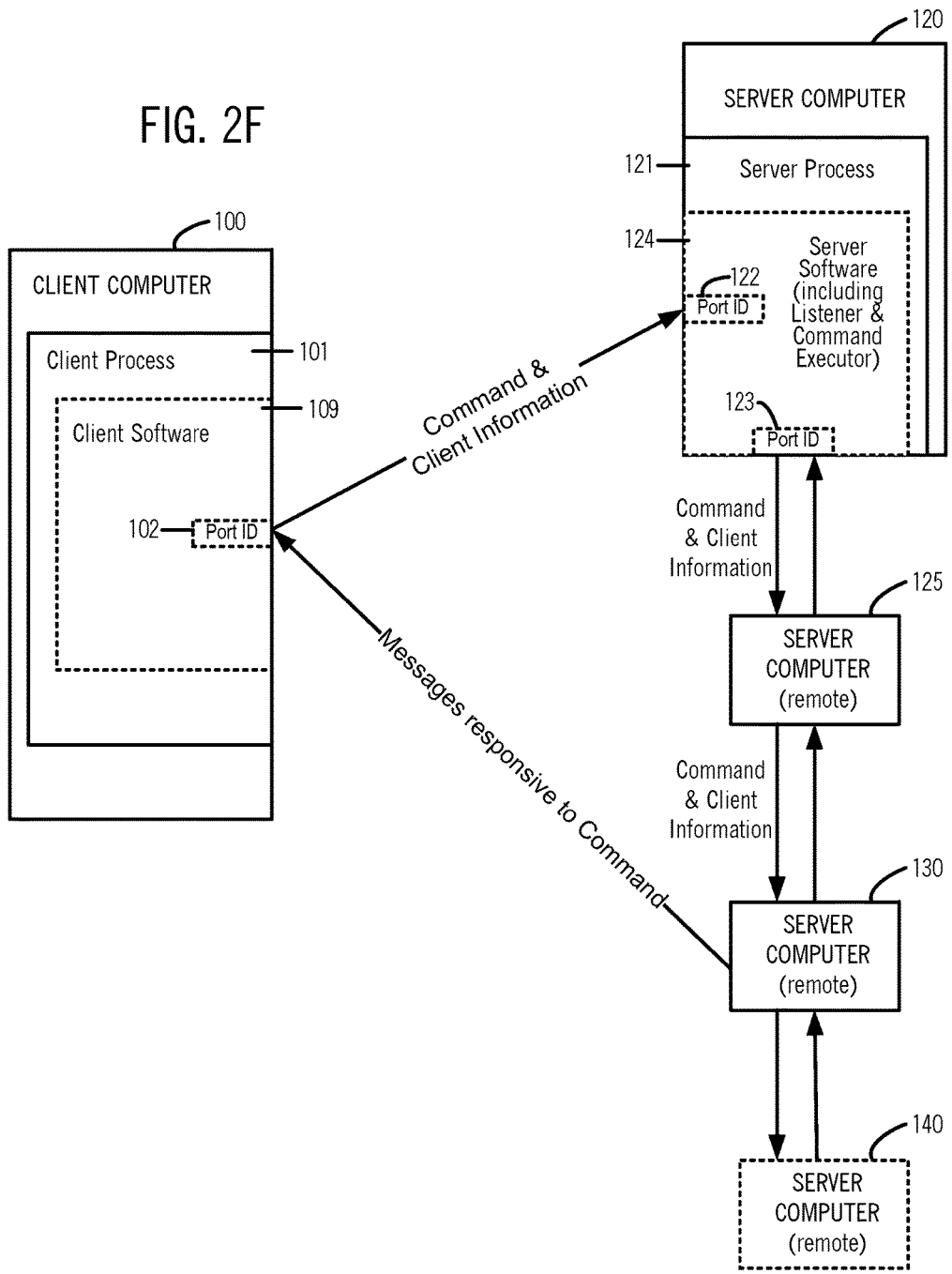

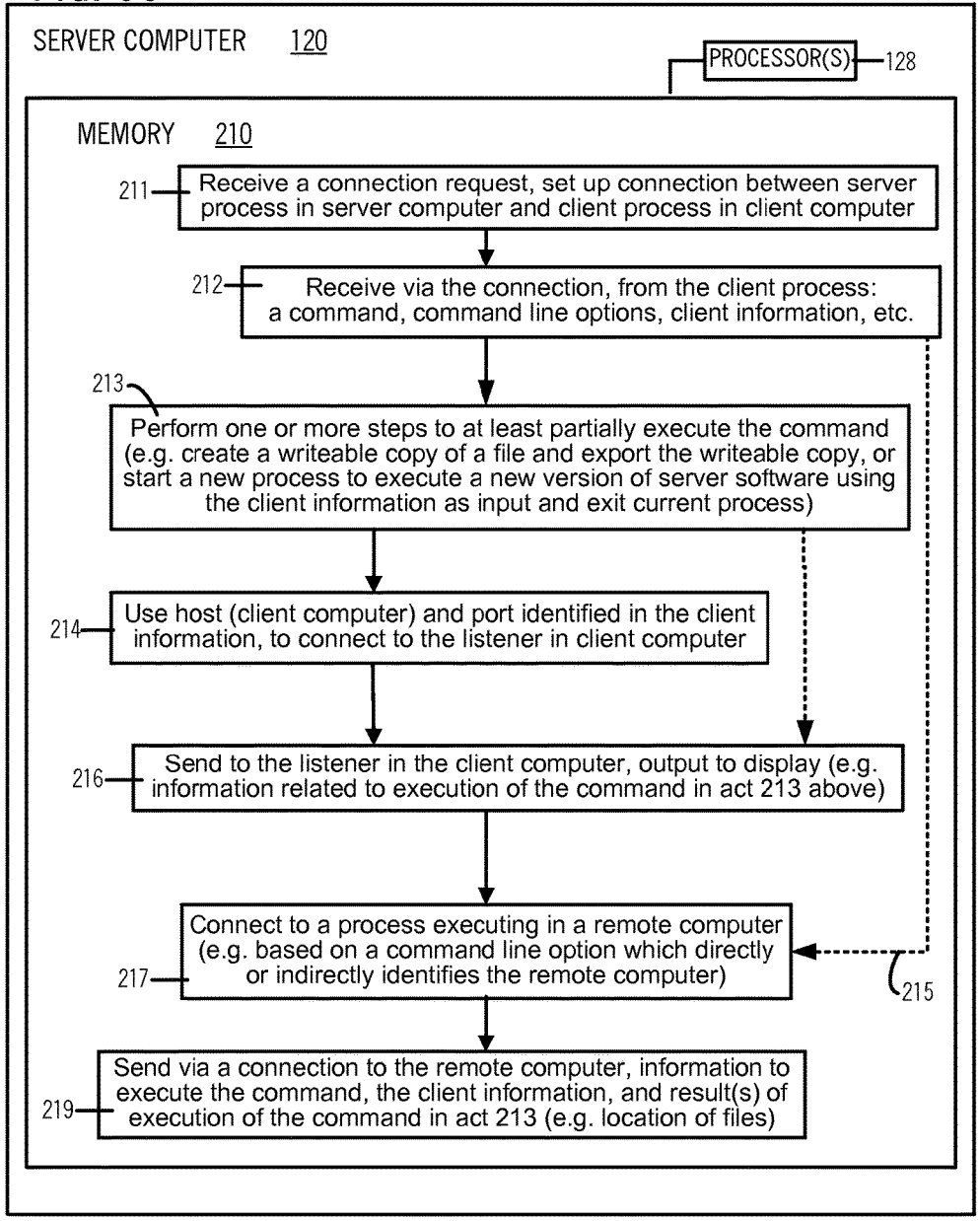

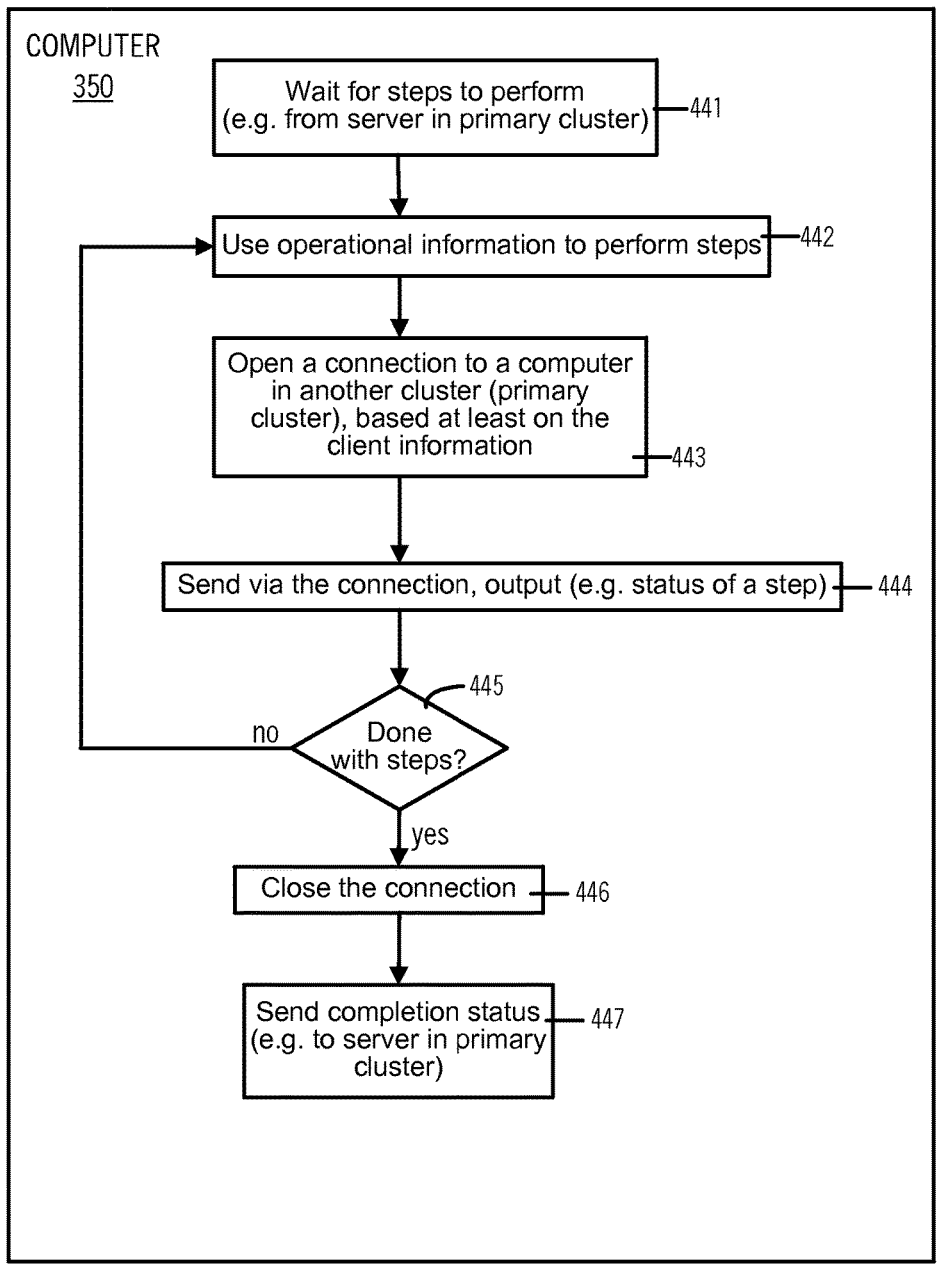

SENDING A COMMAND WITH CLIENT INFORMATION TO ALLOW ANY REMOTE SERVER TO COMMUNICATE DIRECTLY WITH CLIENT

BACKGROUND

It is known for a computer to execute one software (called "client") to send a request over a network, for services or data from (or processing by) another computer that executes another software (called "server"). In one such example, a computer executing a server may receive via the Internet, from a computer executing a client, a request to search for US Patents, the request specifying one or more search criteria, e.g. date of publication, inventor name, etc. In this example, the computer executing the server (called "server computer") operates on the request, to perform the search as per the search criteria. Then, the server computer returns a response (e.g. web page) with search results, to the computer executing the client (called "client computer").

FIG. 1A illustrates a prior art system in which a publicly-accessible server computer 20A receives a request via a public network, queries one or more internal server computers 20I, 20J . . . 20N, and assembles a response to be provided to client computer 10. One disadvantage noted by the current inventors is that the publicly-accessible server computer 20A is required in all communications between the client computer and the internal server computers 20I, 20J . . . 20N, which makes the work of the publicly-accessible server computer 20A unnecessarily complicated. FIG. 1B illustrates another prior art system, in which internal server computers 20I, 20J . . . 20N of FIG. 1A are connected to the public network, over which client computer 10 may send requests to each of server computers 20A, 20I, 20J . . . 20N individually and independently. The current inventors note that in the architecture of FIG. 1B, client computer 10 must have more logic than in FIG. 1A, to generate and transmit each of Request1, Request2, Request3 and Request4 to respective server computers 20A, 20I, 20J and 20N, and to receive and process corresponding responses received therefrom. For example, client computer 10 of FIG. 1B needs information on how to individually connect, to each of server computers 20I, 20J . . . 20N, which was unnecessary in the architecture of FIG. 1A. Hence, prior art can benefit from an improvement, as follows.

SUMMARY

In certain embodiments of the invention, a first process (also called client process) that executes in a computer (also called client computer), retrieves from a memory of the computer, an identifier of a port in the computer (also called listener port identifier), at which a listener waits to receive one or more messages. After retrieving the listener port identifier, the first process sends to a second process in another computer (also called server computer), in the payload of one or more messages, at least a command to be executed remotely (also called remotely-executable command) and additional information (also called client information) which includes the listener port identifier, and which optionally includes an identifier of the first computer. The second process may send the client information to any third process, for use by the third process in sending directly to the first process (without passing through the second process), one or more messages that are responsive to the command (e.g. messages requesting a password before performing one or more steps in executing the remotely-executable command).

In embodiments of the type described above, the client computer does not send the remotely-executable command and the client information to the third process, which instead receives these from the second process. In several such embodiments, the second process and the third process are both server processes, which may execute, depending on the embodiment, identical or different server software (e.g. software of a web server, or an application server, or a HTTP server). In these embodiments, the first process is a client process, which executes client software, e.g. software of a user interface, such as a web browser or a command line tool. In embodiments of the type described above, listener software, which is attached to a port identifier that is sent with a remotely-executable command, may execute in a thread of the first process, or alternatively in a separate process within the client computer, depending on the embodiment. In embodiments wherein a separate process is used to execute listener software, the separate process transfers to the client process, at least the data in payload of one or more messages received at the port identifier, e.g. by use of an area of memory in the client computer, wherein such an area of memory is shared therebetween. In the just-described embodiments, such a shared memory area in the client computer may be used to transfer the listener port identifier, between a listener and a client process.

The message(s), whose payload(s) carry a remotely-executable command and client information, from a client process in a client computer to only one server process (e.g. a second process) in a server computer as described above, may conform to a connection-oriented transport layer protocol (such as TCP) or conform to a connectionless transport layer protocol (such as UDP), depending on the embodiment. Thus, message(s) in accordance with a transport layer protocol, which carry a port identifier of a client computer in a header of the message(s) in a normal manner, additionally carry in payload of the same message(s), at least the listener port identifier of the client computer and a remotely-executable command. Thus, client information, which is carried in payload of such message(s) includes the remotely-executable command, the listener port identifier, and optionally includes (depending on the embodiment) an identifier of the client computer that originated the remotely-executable command, even when the client computer's identifier is included in the header of such message(s). In certain embodiments, an originating client computer's identifier may be not included in the client information carried in payload of message(s) that carry a remotely-executable command, in which case the client computer's identifier may be retrieved from a transport layer header of these message(s), e.g. by a first server computer that receives the just-described messages(s) from the originating client computer.

A listener port identifier and an originating client computer's identifier, on receipt in any remote server computer in addition to a remotely-executable command, may be used by any server process executing therein, to send one or more messages directly to the originating client computer, while listener software is executing in the originating client computer, e.g. to provide or request information related to the remotely-executable command (also called remotely-originated information). In embodiments of the type described above, prior to receipt of the one or more messages containing remotely-originated information, the originating client computer lacks at least some information that is needed to access a server process in a remote server computer (also called remote server information) which may send back message(s) related to the remotely-executable command directly to the originating client computer. Even in the absence of such remote server information, when one or more messages containing remotely-originated information are received at an originating client computer's internal listener (e.g. via a new connection to the listener port identifier), information carried in the payload of the message(s) is extracted and used, e.g. displayed and/or any remotely-originated commands contained therein are executed.

Specifically, remotely-originated information may include, for example, one or more command(s) to be executed by an originating client computer, as may be described in a mutually-agreed protocol (also called command protocol) between client and server computers (e.g. a list of client-executable commands, exchanged ahead of time). As another example, such remotely-originated information may include output of execution of the remotely-executable command (which was initially sent by the originating client computer), at each of certain steps in remote execution. Thus, remotely-originated information which is received by an internal listener, e.g. via one or more new connections to the listener port identifier from one or more remote server computers, may be displayed on a monitor, which is coupled (directly or indirectly) to the originating client computer.

Embodiments of the type described above eliminate changes to a remote server process that may be otherwise required, e.g. when a new requirement is made for a server computer to obtain a password before executing a command. Specifically, in several embodiments, a remote server computer is programmed to use a new connection to a client computer (set up during execution of its listener software, by use of the client information) to transmit a client-executable command to request a password, without involving any intermediate server computer(s) via which the command and the client information were initially received. In this example, a client process may be programmed to obtain and supply a password when remotely-originated information received at its internal listener includes a client-executable command, e.g. by displaying a password prompt in a user interface, and sending back to the remote server computer any input that may be received in response to the password prompt.

It is to be understood that several other aspects and embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 2A-2F illustrates, in data flow diagrams, several client server architectures in accordance with the invention.

FIG. 3C illustrates, in another flow chart, acts performed by a first server computer 120 of FIG. 3A, in some exemplary embodiments.

FIG. 4C illustrates, in yet another flow chart, acts performed by computer 350 of FIG. 3E in some exemplary embodiments.

DETAILED DESCRIPTION

A computer 100 (FIG. 2A) of some embodiments in accordance with the invention transmits only to one computer 120 (either over the Internet or over a local network depending on the embodiment), a command to be performed remotely, with additional information (also called "client information") that identifies in computer 100, software (called "listener software") that waits to receive messages that may contain information responsive to the command, e.g. responses or new commands to be executed by computer 100. The client information may be subsequently transmitted, by a process in computer 120 using any information therein, to any process in any other computer 130, which enables a process which receives the client information (called remote server process) to communicate directly with the listener software in computer 100, even though computer 100 has no information on how to access such a remote server process before the direct communication. Direct communication between computers 100 and 130 (FIG. 2A) enables computer 120 which initially receives the command and client information from computer 100, to be excluded from any further communications responsive to that command, e.g. when the command is executed remotely.

Figure 1A:
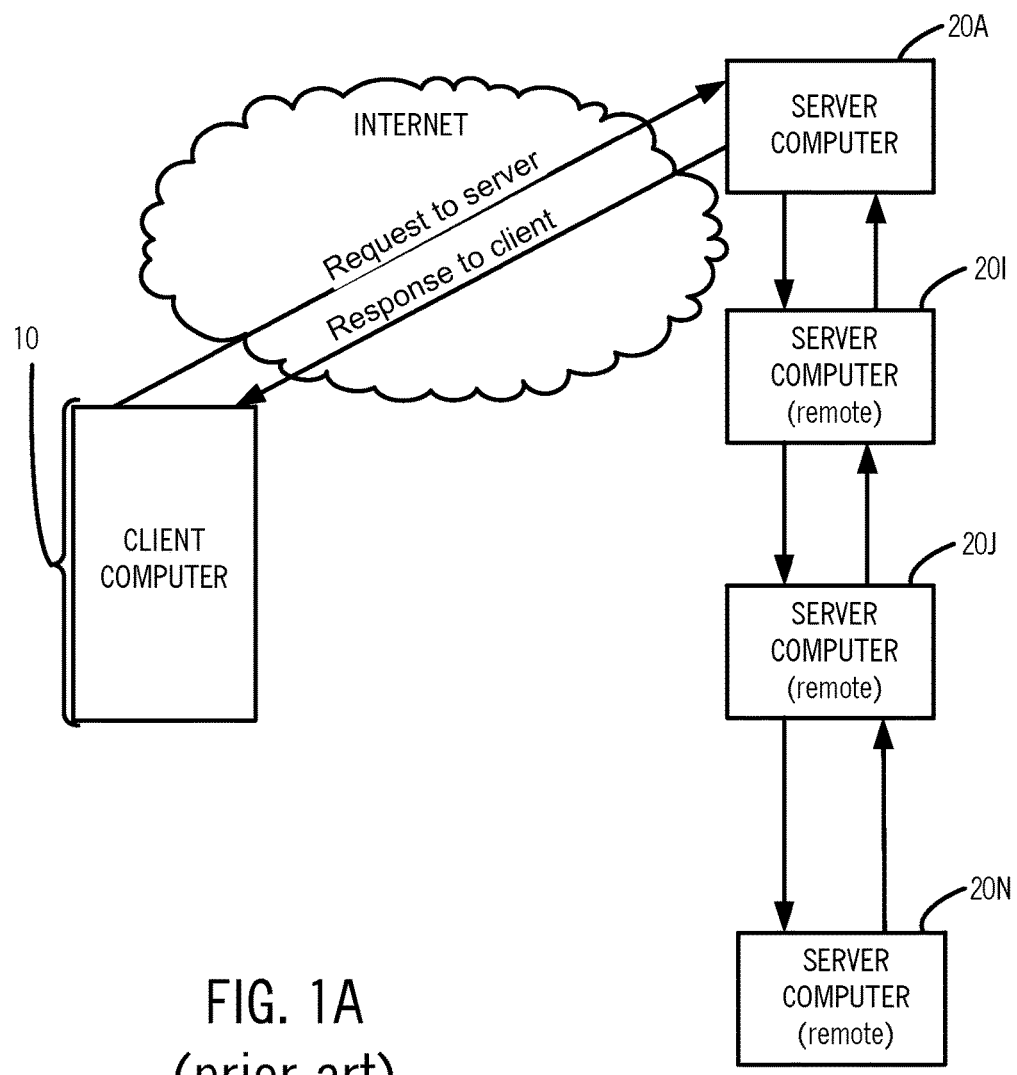
FIGS. 1A and 1B illustrate, in data flow diagrams, some client server architectures of the prior art.
Figure 1B:
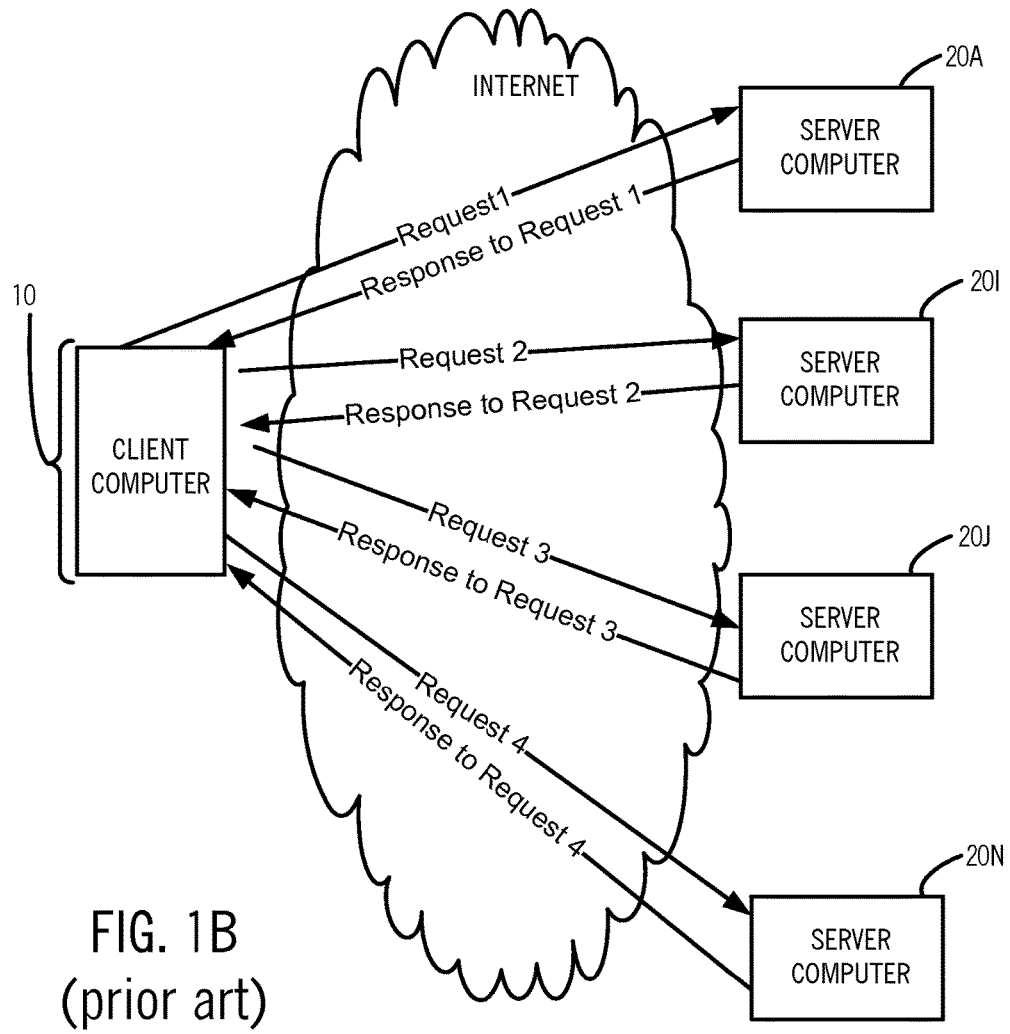
Figure 2B:
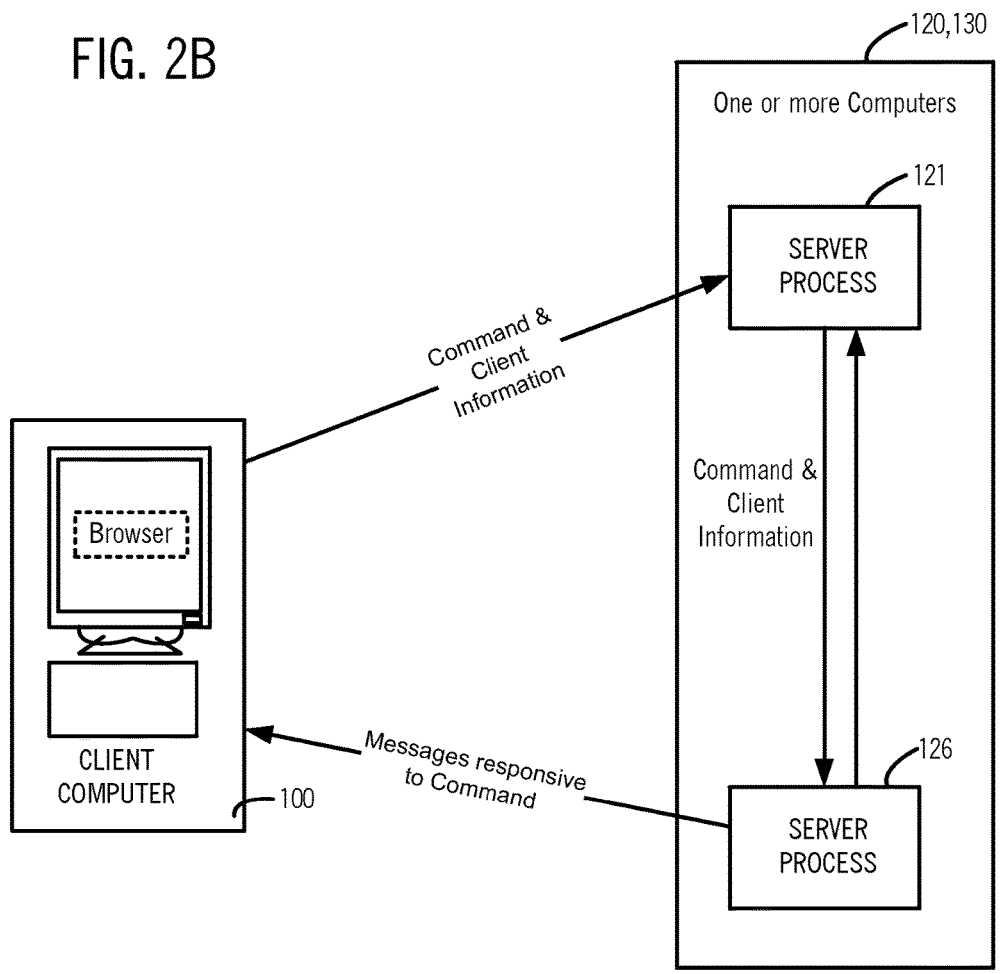

As noted above, use of client information enables a remote server process which may be executing in any computer, such as computer 125 or 130 (FIG. 2A) to communicate directly with computer 100 without involving computer 120, thereby eliminating latency and network load that arise when remotely-originated information is sent back indirectly via computer 120. As another example, one process 121 (FIG. 2B) may initially receive the command (with client information) from computer 100, and then provide the client information to another process 126, so that process 126 may then communicate directly with computer 100 without involving process 121, e.g. by sending messages with payload containing remotely-originated information responsive to the command, such as status of execution of the command and/or output generated by execution of the command. The just-described processes 121 and 126 may execute in one or more computers, depending on the embodiment. More specifically, in some embodiments both processes 121 and 126 (FIG. 2B) execute in a single computer 120, and in other embodiments processes 121 and 126 execute in different computers e.g. process 121 in computer 120, and process 126 in computer 130 respectively (FIG. 2A).

In certain embodiments, a process 101 (FIG. 2C), hereinafter client process, executes client software 109 (such as instructions in a user interface tool, e.g. a command line interface) in a computer 100, hereinafter client computer, to create a connection (e.g. using a port identifier 102) to another process 121 hereinafter server process, in another computer 120, hereinafter server computer. Server process 121 may be any process in server computer 120 that waits to receive commands, executes (or transmits to another computer for execution) each received command, and optionally sends back results of execution (to whichever client process sent the command). Examples of server process 121 are a web server, or a HTTP server. Client process 101 may be any process in client computer 100 that transmits only to server process 121, a command to be executed remotely, e.g. in a remote server process in server computer 130. At the time of sending the command to server process 121, client process 101 lacks at least some information that is needed to access a remote server process in server computer 130 (also called remote server information), which may send back message(s) responsive to the remotely-executable command. Examples of client process 101 are a browser, or a command line user interface tool. In such embodiments, server process 121, which receives a command and client information from client process 101, transmits the command to server computer 130 for execution therein. Even in the absence of remote server information, listener software of client process 101 waits for messages at port identifier 104 in client computer 100 (FIG. 2C), and whenever one or more messages containing remotely-originated information are received (e.g. via a new connection to port identifier 104), information carried in the payload of the message(s) is extracted and displayed and/or any remotely-originated commands contained therein are executed.

A connection which is used by client process 101 to transmit the command and client information only to server process 121 (FIG. 2C) may be implemented by interprocess communication over a network, e.g. supported by functionality in executing clusterware software. Such a command-transmission connection is normally set up between one connection end point in client computer 100 as agreed upon between operating system and client process 101, e.g. identified by a port identifier 102 (FIG. 2C) in client computer 100 and another connection end point in server computer 120 as agreed upon between operating system and server process 121, e.g. identified by another port identifier 122 (FIG. 2C). In situations wherein computers 100 and 120 are clustered, the command-transmission connection conforms to a specific protocol implemented in the clusterware software, which may be a proprietary protocol or an unpublished protocol in certain embodiments, or which may be a published, industry-standard protocol for transporting messages between processes (e.g. layer 4 of the OSI reference model), such as the well known as Transmission Control Protocol (TCP) in other embodiments.

Client process 101 (FIG. 2C) may be identified indirectly in some embodiments, by including in client information, a port identifier 104 within computer 100 at which a process (e.g. client process 101 that originated the remotely-executable command) has attached a listener, to receive in computer 100, one or more command-responsive messages (e.g. responses). Specifically, in some embodiments a process in computer 100 (e.g. client process 101) starts execution of listener software 103, which attaches itself to a port (called listener port), identified by port identifier 104. In some embodiments, execution of listener software 103 may be done in a new thread that is internal to client process 101, or alternative embodiments may start a new process in client computer 100 to execute listener software 103. Depending on the alternative embodiment, a new process which executes listener software 103 may be either started by client process 101 or started by any other process, e.g. a database process or an operating system process. In some alternative embodiments in which listener software 103 is executed in a process that is different from client process 101, these two processes may share an area of memory 200 in client computer 100, and use the shared memory area (e.g. SGA memory used by software of a relational database management system, such as Oracle Database 11g release 2, available from Oracle Corporation) to transfer between these two processes, at least the payload of messages received in client computer 100 at port identifier 104 (e.g. as identified in a destination port field of a transport-layer header of such messages). Listener software 103 may be a portion of server software 124 which is similarly or identically executed in server computer 120 (described above), to receive messages at port identifier 122.

In some embodiments, client process 101 (FIG. 2A) may be identified directly, e.g. by including in information internal to a client ("client information") which is transmitted in payload of transport layer messages in addition to a command, an identifier of process 101 (also called "Process Identifier", or PID) or a name of the process (e.g. a name of a binary file being executed, such as "rhpctl") and optionally an identifier of a computer (e.g. IP address of computer 100). The just-described process name may be used in some embodiments by any computer that receives client information, such as computer 130 (FIG. 2C) to look up, by use of a name server or a directory service (e.g. in computer 100), an end point (e.g. port identifier 104) at which client process 101 is configured in client computer 100 to receive and use messages responsive to a command originated therein. Examples of use of one or more command-responsive messages by client process 101 are: transferring information in payload of these messages to another process as input thereto, or displaying the information on a monitor, or executing a command included in the information.

In some embodiments, a port identifier 122 (or other such end point for an interprocess connection) in server computer 120 may be known ahead of time to client process 101 in computer 100, e.g. a unique identifier 122 of a server port may be hard-coded to default to the value 7777 in a client instruction in client software 109 (FIG. 2C) executed by client process 101 and the same default value 7777 may also be hard-coded in a server instruction in server software 124 that is executed by server process 121, to create a server port in server computer 120. Instead of hard-coding, a value of for an identifier 122 of a server port may be stored in a configuration file, e.g. called staticports.ini, which is used by installation software (e.g. Oracle Universal Installer) when starting a server process 121, using the port identifier 122 in such a file as its input parameter. Depending on the embodiment, either or both of port identifiers 104 and/or 122 (FIG. 2C) may be stored in a memory of respective computer(s) 100 and/or 120 e.g. stored in a code memory in case of being hard-coded, or stored in a data memory in case of a configuration file.

Independent of how a port identifier of a listener port or server port is stored in computer memory, such a port identifier may be retrieved from memory in act 203 (FIG. 3B) as described below. After act 203 to retrieve a listener port identifier from memory 200 (which may be a shared memory area in computer 100), client process 101 (FIG. 3B) performs act 204 to send a remotely-executable command with client information. Similar or identical to the description in a paragraph preceding the above paragraph, in performing act 204, client process 101 may itself also use, for example a name server, or a directory service in server computer 120, to identify an end point in server computer 120 (e.g. server port identifier 122), at which command-transmission connections originating at any client computer may end. Such an end point may be dynamically assigned in server computer 120 by server software known as an application server, which is executed in some embodiments of server process 121, such as the Oracle Application Server, as described in, for example, a book entitled "Oracle® Application Server, Administrator's Guide, 10g Release 3 (10.1.3.2.0)" version, B32196-01, published January 2007, which is incorporated by reference herein in its entirety. After act 204, client process 101 performs act 208 (FIG. 3B) to receive messages responsive to the remotely-executable command, e.g. messages with payload containing information related to execution of the remotely-executable command.

In certain connection-oriented embodiments, at some stage, before transmission of the command and client information in payload of messages from client computer 100 in act 204, a command-transmission connection is formed between client process 101 in client computer 100 and server process 121 in server computer 120, between respective end points, e.g. client port identifier 102 and server port identifier 122. Specifically, a command-transmission connection may be formed on performance of act 201 (FIG. 3B) by client process 101 in client computer 100 and on performance of act 211 (FIG. 3C) by server process 121 in server computer 120. Other connection-oriented protocols may be used in other embodiments, to form a command-transmission connection between client process 101 and server process 121, using sockets, or other such connection-oriented end points, which may be implemented with or without use of various types of data structures in memory depending on the embodiment, such as queues in memories 200 and 210 of respective computers 100 and 120. For example, an end point may be implemented in some embodiments of client computer 100 as an index into a table in memory, wherein a row identified by the index may contain a pointer to metadata in memory which identifies, e.g. listener software waiting to receive messages in accordance with a predetermined transport layer protocol that is connection-oriented or connectionless depending on the embodiment.

Figure 3A:
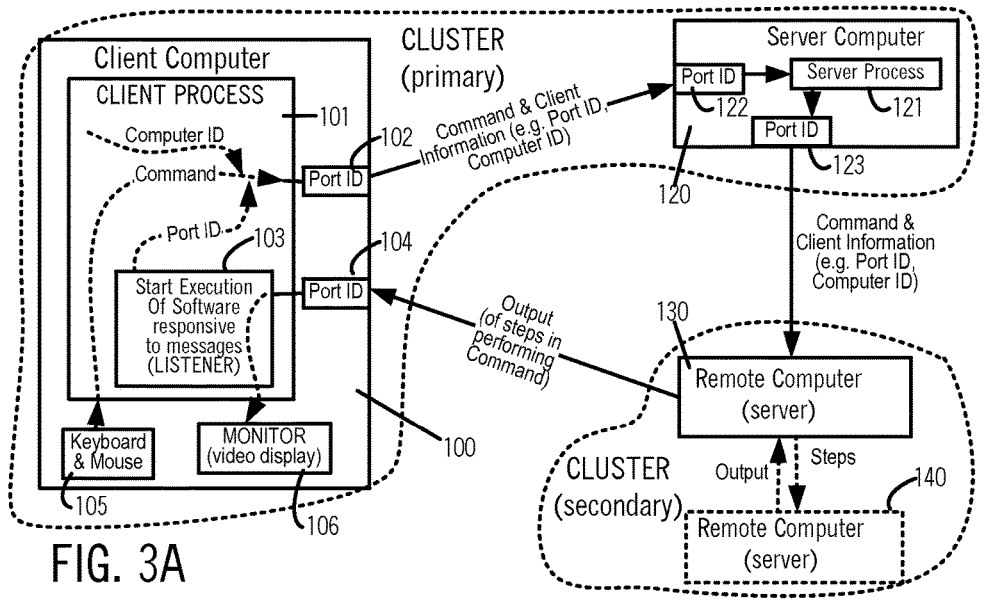
FIG. 3A illustrates, in a data flow diagram, a command (to be remotely executed) and client information being sent from a client computer 100 via a first server computer 120 to a remote server computer 130 that sends output back to client computer 100, in accordance with the invention.

In certain embodiments, before, after or concurrently with the formation of a command-transmission connection as described above, a process in client computer 100 (e.g. either client process 101 or another process, such as a database process or a process of the operating system) performs an act 202 (FIG. 3B) by starting execution in client computer 100 of at least a portion of server software 103 (FIG. 3A), hereinafter listener, that waits to receive messages at a connection end point or port identifier 104, also called listener port identifier, in client computer 100. In some embodiments, client computer (also referred to as host) 100 dynamically allocates an identifier 104 to identify a port, e.g. by storing the identifier 104 at a location in a memory 200 which is internal to client process 101 and thus accessible to listener 103. Hence, in several embodiments, client process 101 performs an act 203 (FIG. 3B), by retrieving from memory 200 (FIG. 3B), listener port identifier 104 (FIG. 3A). In alternative embodiments, the identifier 104 of listener port may be hard-coded, in which case the identifier 104 is retrieved in act 203, from a memory of client computer 100 which stores the server software portion for use in execution as listener 103.

Figure 2E:
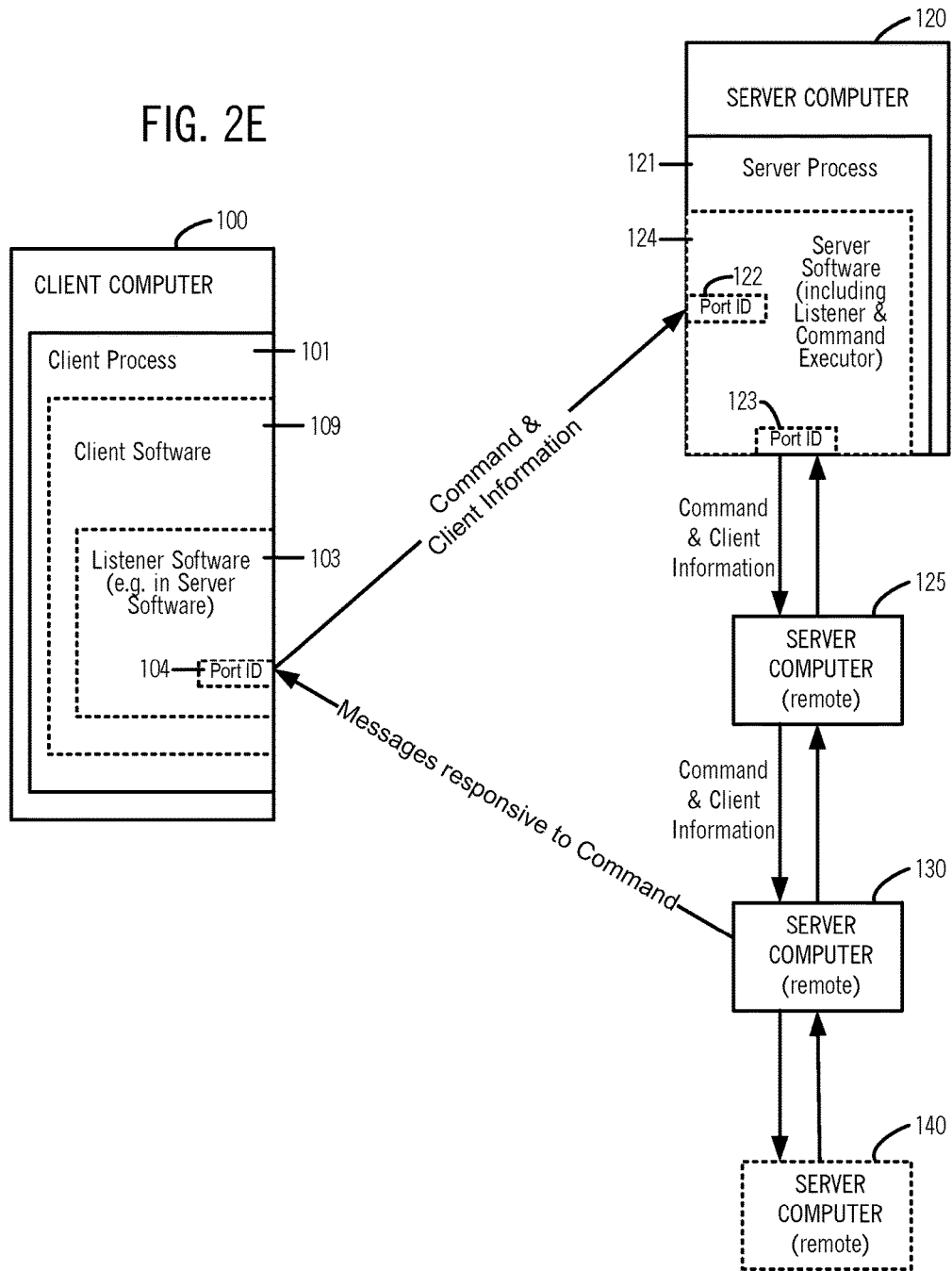

In some alternative embodiments, certain software may include listener software and client software integrated together as a single monolithic piece of software that is executed by client process 101 as shown in FIGS. 2D, 2E and 2F. Several such embodiments include two port identifiers 102 and 104 in messages transmitted by client computer 100 as described above, specifically (A) port identifier 102 is used in the header of transport layer messages, e.g. to form a connection for use in transmitting a command and client information to server computer 120, and (B) port identifier 104 is transmitted in the payload of transport layer messages, as a portion of client information, for use by any server process (e.g. in server computer 130) to report back to client process 101, e.g. over a command-responsive connection, information related to the command, as shown in FIG. 2D. In the just-described embodiments, client process 101 may optionally use the listener port identifier 104 to send back response(s) to any server process (e.g. server computer 130), e.g. over the same command-responsive connection, the response(s) being based on execution of client-executable commands if included in remotely-originated information received at the listener port identifier 104 by client process 101 (e.g. from server computer 130).

Although use of two port identifiers in client computer 100 has been described above, some embodiments of client computer 100 may use only one port identifier, e.g. as illustrated in FIGS. 2E and 2F. In some embodiments, client software 109 (FIG. 2E) uses port identifier 104 of the listener port in one period of time to transmit only to server process 121, a command and client information (which includes the same port identifier 104), and subsequently uses the same port identifier 104 of the listener port in another period of time to receive messages related to the command. Similarly, in certain embodiments, client software 109 (FIG. 2F) does not invoke server software, and instead simply uses port identifier 102 in one period of time, to form a command-transmission connection to server process 121 on which a command and client information are transmitted only to server process 121, then closes the command-transmission connection, and thereafter in a subsequent period of time, uses the same port identifier 102 in one or more command-responsive connection(s) to receive messages related to the command from one or more server processes (which may or may not include the same sever process 121, depending on the embodiment). Although in some embodiments, client process 101 closes the command-transmission connection to server process 121, in other embodiments server process 121 itself may close the command-transmission connection (although opened by client process 101), e.g. after receipt of the command and client information by server process 121 but before performance of one or more steps to execute the command, in order to conserve resources (such as memory and processing power) that are otherwise consumed to keep the command-transmission connection open.

In some embodiments, listener 103 (FIG. 3A) is instantiated by client process 101 in client computer 100 (e.g. by creating a new instance thereof in memory 200), to execute a portion of server software that is similar or identical to server software executed by server process 121 in server computer 120. In some illustrative examples, server process 121 in server computer 120 and listener 103 in client computer 100 are both implemented by execution (in respective processors 128 and 108) of one or more portions of server software (stored in respective memories 210 and 200) included in an application server, such as the Oracle Application Server described above. Specifically, in some embodiments, one or more portions that are commonly executed by each of server process 121 and listener 103 (in respective processors 128 and 108) are one or more components of software available in a container for Java 2 Enterprise Edition (J2EE), such as Oracle Containers for J2EE (OC4J).

OC4J is described in, for example, a book entitled "Oracle® Containers for J2EE Configuration and Administration Guide, 10g (10.1.3.5.0)", version E13978-01, published July 2009, which is incorporated by reference herein in its entirety. OC4J is additionally described in, for example, another book entitled "Oracle® Containers for J2EE Deployment Guide, 10g (10.1.3.5.0)" version E13980-01, published July 2009, which is also incorporated by reference herein in its entirety. In such embodiments, listener 103 may execute a standalone configuration in which OC4J is installed as a single, standalone server instance, and directly managed as a self-contained component, while server process 121 may execute a managed configuration in which OC4J is installed and managed as a component of the Oracle Application Server.

As another illustrative example, server process 121 in server computer 120 and listener 103 in client computer 100 may be both implemented by execution (in respective processors 128 and 108) of server software (stored in respective memories 210 and 200) that implements an application server of the type described in, for example, US Patent Publication 2014/0095644 entitled "Processing of Write Requests in Application Server Clusters" by Krishnamoorthy Dharmalingam, et al. which is incorporated by reference herein in its entirety. As yet another illustrative example, server process 121 in server computer 120 and listener 103 in client computer 100 may be both implemented by execution (in their respective processors 128 and 108) of server software (stored in respective memories 210 and 200) that implements an application server of the type described in, for example, US Patent Publication 2012/0066363 entitled "System And Method For Using A Grid Link Data Source To Connect An Application Server With A Clustered Database" by Alex Somogyi, et al. which is incorporated by reference herein in its entirety.

Figure 3B:
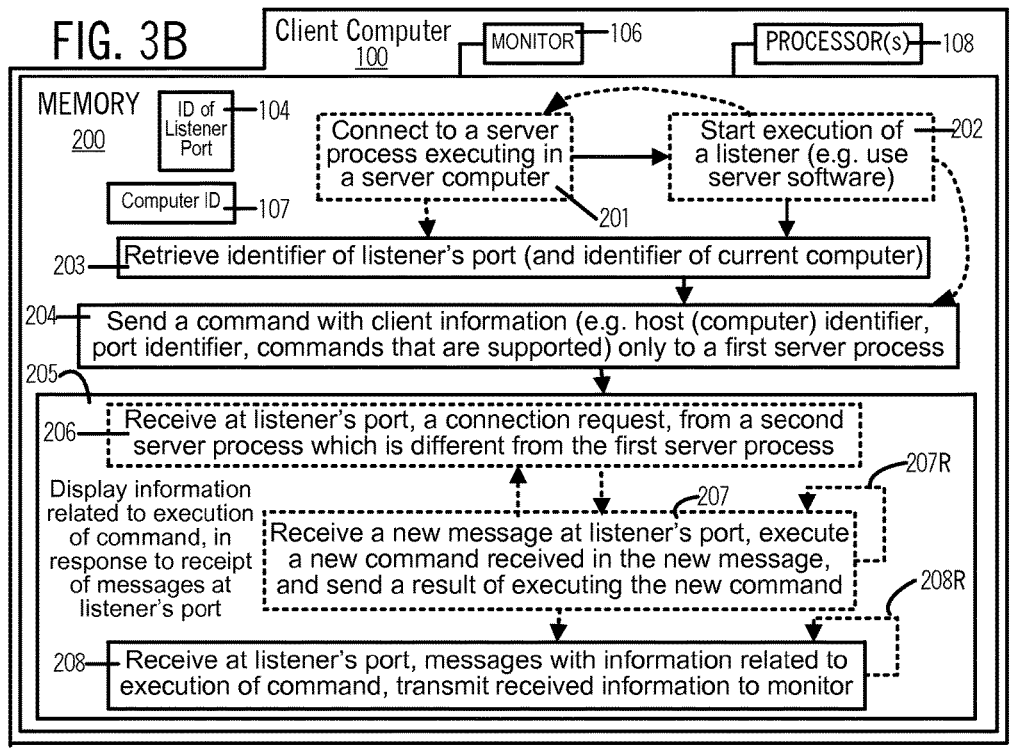
FIG. 3B illustrates, in a flow chart, acts performed by client computer 100 of FIG. 3A, in some exemplary embodiments.

In some embodiments of the above-described act 203 (FIG. 3B), client process 101 additionally retrieves from memory 200, an identifier 107 of client computer 100 (FIG. 3B). Identifier 107 may be stored in memory 200, e.g. by a driver of a network interface card (NIC), e.g. in the form of an address that conforms to the Internet Protocol (IP). Thereafter, in some embodiments of act 204, client process 101 prepares a message payload including a command to be executed remotely, and information retrieved in act 203 (also called "client information"), which may include, for example, the identifier 104 of listener port, and an identifier 107 of client computer 100, and then client process 101 invokes a service in the operating system (e.g. TCP/IP stack) to send the message payload to server process 121, via the above-described command-transmission connection between client port identifier 102 and server port identifier 122.

In some embodiments, the remotely-executable command which is sent in act 204 is received in client process 101 by execution of a user interface tool, e.g. a command line interface, that in turn receives the remotely-executable command in the form of a string of characters, which may be generated in a normal manner, by manual use of a keyboard and/or mouse 105 (FIG. 3A) with a monitor (or video display) 106. In many embodiments, client process 101 receives, in user input, in addition to a command, one or more command line option(s), e.g. identifier of a remote computer 130 (FIG. 3A), and/or name and path of a file to be copied, etc. In such embodiments, in act 204, client process 101 may send only to server process 121, e.g. via the above-described command-transmission connection, in addition to the command and in addition to the client information, one or more command line options received in the user input. Values of parameters in such command line options may identify, for example, one or more remote computers 130 and 140 on which the remotely-executable command is to be executed, e.g. by a logical name, which may be translatable into an IP address by server process 121, using local information in server computer 120 (e.g. a name resolution table in a hosts file within server computer 120). In some embodiments, although a logical name of remote computer 140 is sent in act 204, with the command and with the client information, client process 101 does not translate the logical name (e.g. received in user input as a command line option) into an IP address, and thus client process 101 has no information on how to access a server process in remote computer 130 (which in turn has local information on how to access a server process in remote computer 140).

The content of client information sent with a remotely-executable command in act 204 depends on the embodiment. For example, in some embodiments, server process 121 is programmed to obtain identifier 107 of client computer 100 from its own local memory, wherein the client identifier is stored therein, e.g. by act 211 which was performed to set up the above-described command-transmission connection. In the just-described example, the client information sent with a command in act 204 includes the identifier 104 of listener port and excludes the identifier 107 of client computer 100. Moreover, in some embodiments, listener 103 and/or client process 101 may be programmed to execute commands contained in payload of messages that are received using listener port identifier 104, in which case the client information sent in act 204 may identify one or more commands that are supported. Furthermore, the client information sent in act 204 may include any other information, if known to be needed to execute the command, e.g. a password. Thus, at least a command and client information sent in act 204 via the command-transmission connection is received by server computer 120 in an act 212, as shown in FIG. 3C. Server computer 120 may receive, in act 212, any other information also sent in act 204, such as command line options, depending on the embodiment.

After act 204 (FIG. 3B), client computer 100 displays on monitor 106, in an act 205, information related to execution of the command sent in act 204, e.g. in response to receipt of one or more messages using listener port identifier 104, when the payload of these one or more messages include information for display (e.g. responses to the command, or new commands to be executed by client computer 100). Specifically, in some embodiments, client computer 100 implements act 205 by performing act 208 (FIG. 3B), wherein one or more message(s) are received using listener port identifier 104, and these message(s) payload(s) contain information related to remote execution of the command (which was sent in act 204). Depending on the embodiment, act 205 may be performed by client process 101 or by listener 103 or any combination thereof.

The information related to remote execution of the command may be generated, for example, in an act 213 (FIG. 3C) performed by server process 121 in server computer 100, after receipt of the remotely-executable command and the client information in act 212 (described above). Specifically, in act 213, depending on the command that is received from client computer 100, server computer 120 may, for example, create a writeable copy of a file and export the writeable copy, or start a new process to execute a new version of server software (using the client information as input thereto), and end the current server process 121. Thereafter, in an act 216 (FIG. 3C), performed by server process 121, output generated by performing act 213 is sent in the payload of one or more messages to listener port identifier 104 (via a new connection set up in act 214 in connection-oriented embodiments, or without using a connection in connectionless embodiments or re-using an existing connection from a previous communication).

In some embodiments of act 208 (FIG. 3B) performed in computer 100, information which is extracted from the payload of the messages received using listener port identifier 104, is related to execution of the remotely-executable command, and is displayed on monitor 106 (FIG. 3A). In some embodiments, listener 103 forms a new connection using listener port identifier 104, also called a command-responsive connection. However, when the only action performed is to display status extracted from message(s) received using listener port identifier 104, in such embodiments, listener 103 may be implemented to use an end point in a connectionless protocol (e.g. the well-known User Datagram Protocol, UDP), although less secure than a connection-oriented protocol (e.g. the well-known Transmission Control Protocol, TCP). In other embodiments, listener 103 may be implemented to use an end point in a secure connection-oriented protocol (e.g. SSL), in which case the above-described client information which is sent in act 204 includes a credential (e.g. from a credential file in computer 100). In embodiments that display only status, client computer 100 may go directly from act 204 to act 208 (i.e. not perform act 206, and not perform act 207, both described below). Act 208 may be repeated, e.g. until a completion status is received, via the above-described command-transmission connection, between port identifiers 102 and 122.

Act 205 of some embodiments, includes an act 206 in which client computer 100 receives a connection request using listener port identifier 104, for example from server computer 120 or from remote computer 130. For example, in an act 214 (FIG. 3C), server process 121 in server computer 120 may use the identifier 104 of listener port, and the identifier of client computer 100 which are received in act 212, to connect to listener 103 in client computer 100. Similarly, in an act 222, a process in remote computer 130 may use the identifier 104 of listener port and the identifier of client computer 100 (which are received in act 221 from server process 121), to connect to listener 103 in client computer 100. Thus, a message received in act 206 (FIG. 3B) may contain a request to connect, in which case listener 103 forms a new connection (namely the command-responsive connection) using port identifier 104. The command-responsive connection may conform to any industry-standard protocol for connections between processes executing in networked computers, e.g. as specified in a transport layer of the Open System Interconnect (OSI) reference model, such as the Transmission Control Protocol (TCP), in which case the identifier 104 of the listener port (included in client information) may be used in a destination port field in a header of a TCP message received by client computer 100 from remote computer 130.

The just-described command-responsive connection may be used to transport messages that provide client computer 100 with information related to remote execution of the command by remote computer 130 and/or remote computer 140. Specifically, in an act 207 (FIG. 3B), client computer 100 receives, e.g. via the command-responsive connection, a new message whose payload may include a new command to be executed by client computer 100. Such a client-executable command may be executed by client computer 100 to, for example, display a prompt in a user interface with a question specified in the new message, and send back over the command-responsive connection, a result of executing the new command (e.g. any user input that is received, in response to the prompt). The client-executable command may be sent, for example, in act 223 (FIG. 3D) by a process in remote computer 130 which performs one or more steps to execute the remotely-executable command (sent by client computer 100 in act 204).

Act 207 (FIG. 3B) may be repeated, e.g. to process additional messages which may be received via the command-responsive connection, from server computer 120 or remote computer 130. After act 207, client computer 100 may return to act 206, to receive another request to form another command-responsive connection, e.g. from remote computer 140 that may receive the client information from remote computer 130, followed by act 207 once again, e.g. to process any such message(s). In addition to the just-described acts 206 and 207, client computer 100 may also perform act 208, e.g. to receive messages whose payloads contain information related to command execution, and display the information, as described above.

Referring to FIG. 3C, after performing one or more of the above-described acts 211-216, server process 121 performs an act 217, by connecting to a process that is executing in remote computer 130, e.g. based on an identifier of remote computer 130 (and/or another identifier of remote computer 140) which may be received in act 212. Specifically, in some embodiments, a command line option is received in act 212 (with the command and with the client information) and this command line option includes an identifier of remote computer 130 (or alternatively this command line option includes an identifier of another remote computer 140, which may be used by server process 121 in computer 120 to lookup a table stored in memory 210, to identify remote computer 130). Then, in act 219, server process 121 sends, via the just-formed connection, information needed by remote computer 130 and/or remote computer 140, to execute the command, the client information, and results of execution of the command in act 213 described above, e.g. location of files copied.

In some embodiments, server process 121 does not perform any steps to partially execute the command, and instead, simply sends the command to a remote computer, e.g. by going from act 212 directly to act 217 (FIG. 3C). Furthermore, in other embodiments, server process 121 does not perform acts 217 and 219, e.g. when the remotely-executable command is to be performed wholly within server computer 110, as follows.

More specifically, in some embodiments, server process 121 is executing an earlier version of server software, which is to be replaced with a newer version of the server software. In such embodiments, server process 121 may receive, via the command-transmission connection described above, a command including the following instructions. One instruction may require copying the new version of the server software to a predetermined directory, to overwrite files from which the process 121 is executing. Another instruction may require starting, in server computer 120, a new server process executing the new version of the server software, using as input at least the identifier 104 of listener port, an identifier of client computer 100 (e.g. received in act 212 as parts of client information). Yet another instruction may require stopping server process 121. Thus, status of performing the above-described instructions (except the last instruction) may be sent via a command-responsive connection from server process 121 using listener port identifier 104, by repeated performance of act 216 (described above).

In embodiments of the type described in the last paragraph above, when the last instruction is performed in server computer 120, client process 101 receives an error that indicates loss of connection to server process 121 (as server process 121 ends on performance of the last instruction, as described in the preceding paragraph, above). Hence, client process 101 is programmed to respond to receipt of the error, by retrieving one or more messages that are received by listener 103, e.g. via a new command-responsive connection from a new server process in server computer 120 (started after copying the new version of server software, as described in the last paragraph above).

Figure 3D:
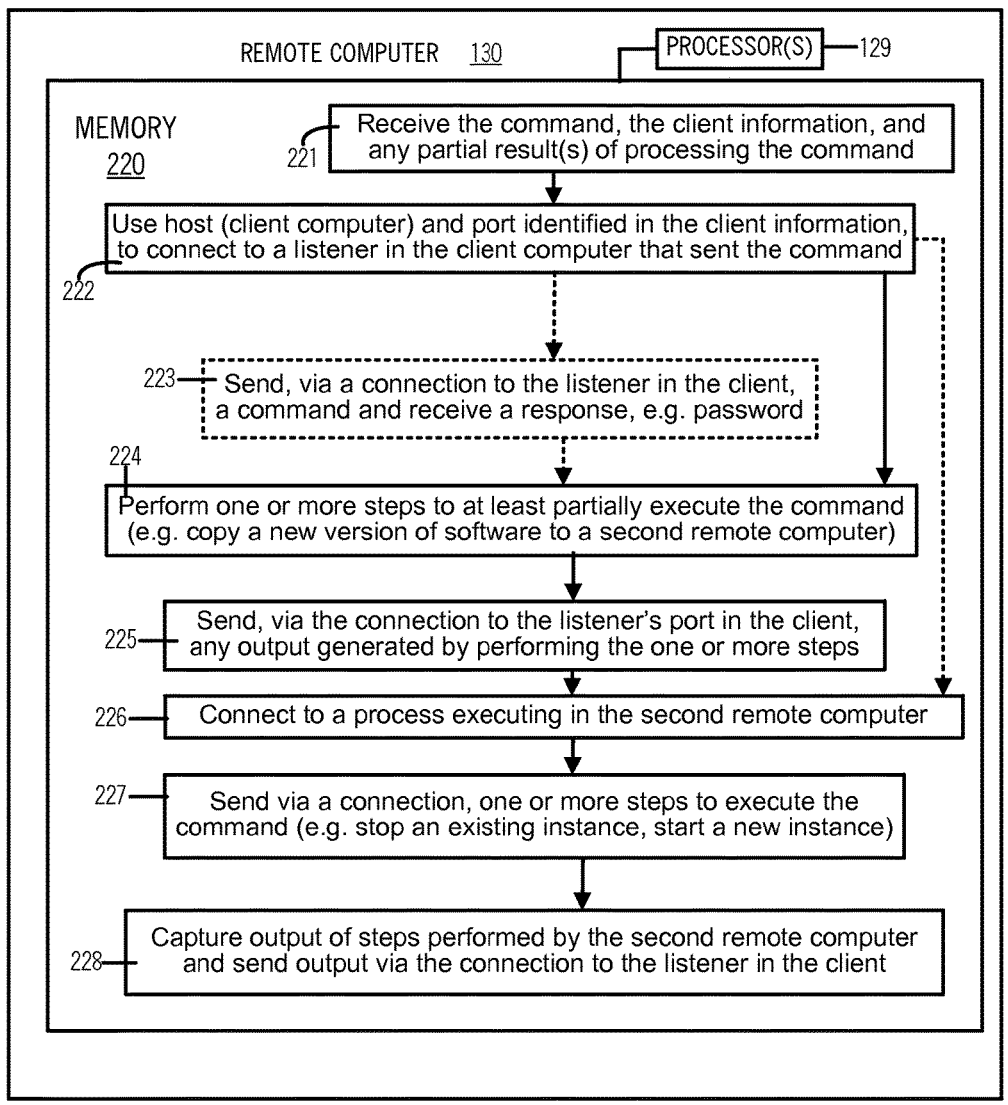
FIG. 3D illustrates, in yet another flow chart, acts performed by a remote server computer 130 of FIG. 3A, in some exemplary embodiments.

Referring to FIG. 3D, a server process in remote computer 130 is programmed with software in memory 220 and executed by processor(s) 129 to perform acts 221-228, as follows. In act 221, the server process in remote computer 130 receives the remotely-executable command and client information, e.g. from server computer 120 when act 219 is performed (as described above in reference to FIG. 3C). In act 221 (FIG. 3D), the server process in remote computer 130 also receives any partial results generated by server computer 120, in processing the remotely-executable command in act 213, e.g. location of files.

Then, in act 222, the server process in remote computer 130 uses the identifier 104 of the listener port which is received in the client information (in act 221), to set up a new connection (namely a command-responsive connection) to listener 103 in client computer 100. The server process in remote computer 130 may optionally perform act 223 to transmit a client-executable command, e.g. to request a password as described above. However, act 223 may be skipped in embodiments that do not require a password for remote computer 130 to perform the remotely-executable command received in act 221.

Thereafter, in act 224, the server process in remote computer 130 performs one or more steps to at least partially execute the remotely-executable command, e.g. by copying a new version of software to a second remote computer 140 (see FIG. 3A). Then, in act 225, the server process in remote computer 130 sends, via the command-responsive connection to the listener's port with identifier 104, any output generated by performing the one or more steps in act 224.

Thereafter, the server process in remote computer 130 performs an act 226, by connecting to a process, hereinafter client process, in the second remote computer 140. In embodiments wherein remote computers 130 and 140 are clustered, act 226 may be implemented by interprocess communication over a network, e.g. supported by clusterware software. Then, the server process in remote computer 130 sends to the client process in remote computer 140, one or more steps that need to be performed by remote computer 140, in order to execute the remotely-executable command, e.g. by stopping an existing instance of a relational database management system (RDBMS) and starting a new instance. Next, in an act 228, the server process in remote computer 130 captures any output generated by performance of the steps in the second remote computer 140, and send the output via the command-responsive connection (set up in act 222) using the listener's port identifier 104 in client computer 100. Note that in embodiments wherein there are no steps that can be performed by remote computer 130, to partially execute the remotely-executable command, acts 224 and 225 may be skipped, so that act 226 is performed after act 222.

Figure 3E:
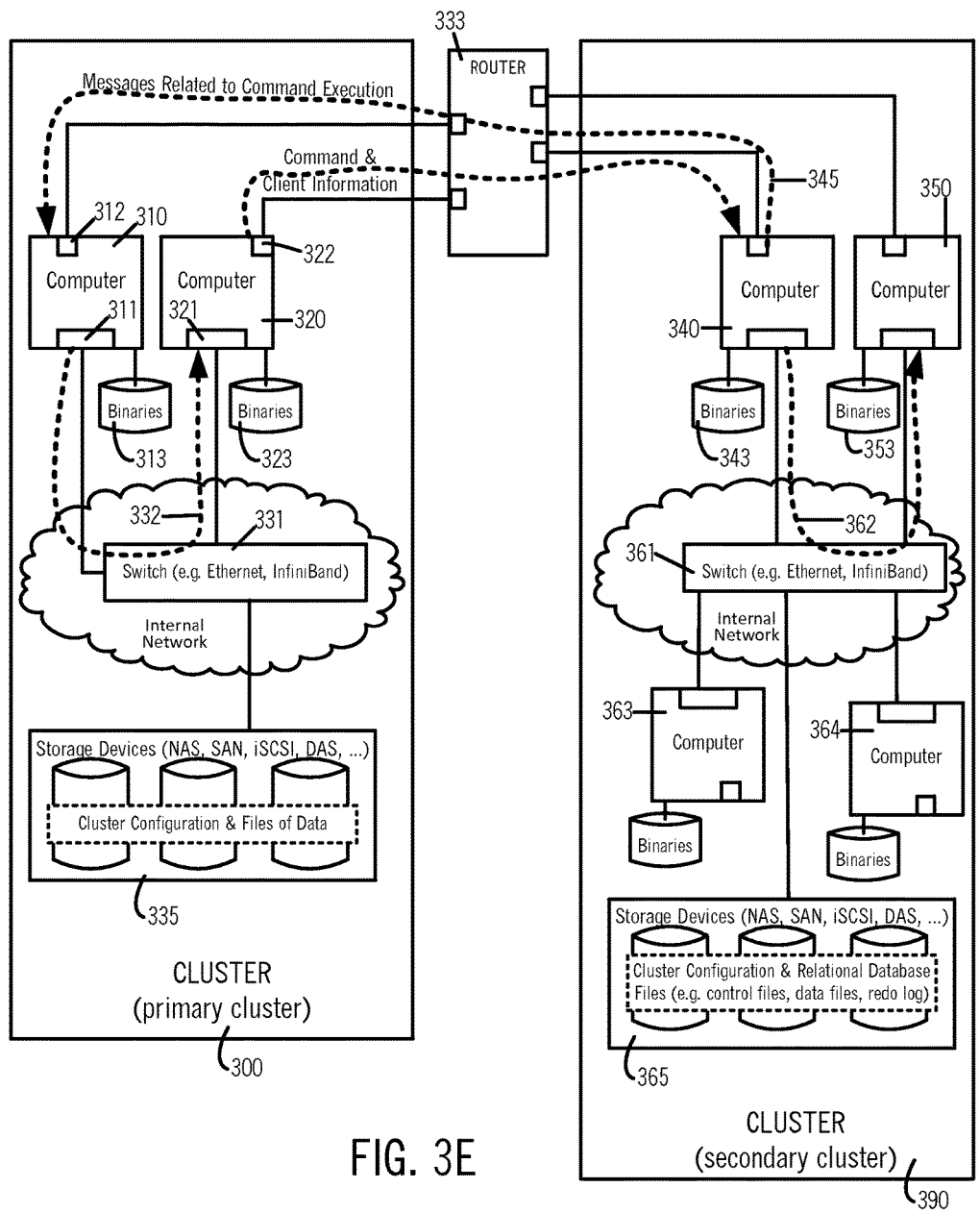
FIG. 3E illustrates, in a data flow diagram, certain embodiments of the invention, wherein the client and server computers of FIG. 3A are configured as nodes implemented by computers 310 and 320 in one cluster 300, and wherein the remote server computers of FIG. 3A are configured as nodes implemented by computers 340 and 350 in another cluster 390.

In some embodiments, computers 100 and 120 of FIG. 3A are implemented as computers 310 and 320 that include respective network interface cards (NICs) 311 and 321 which are interconnected by a switch 331 in a cluster 300 (FIG. 3E). In such embodiments, driver software which is used to access NICs 311 and 321 and which is executed in respective computers 310 and 320 is associated with respective port identifiers, such as port identifiers 102 and 122 described above for respective computers 100 and 120 (FIG. 3A), whereby a command-transmission connection 332 (FIG. 3E) is formed through switch 331. Computers 310 and 320 execute clusterware software to share storage devices 335, also connected to switch 331. The functionality provided by multiple computers executing clusterware software enables computers 310 and 320 to operate as a single system, to provide greater throughput and scalability than possible using a single computer. Information that describes various components of the single system may be stored in a configuration file for the cluster, for example, on storage devices 335. Storage devices (also called shared storage devices) 335 may be configured internally according to any architecture, e.g. network attached storage (NAS), storage area network (SAN), iSCSI, Direct Attached Storage (DAS), etc. Storage devices 335 may store information that is shared by computers 310 and 320, such as cluster configuration, and files of data. Thus, storage devices, 335, switch 331, and computers 310 and 320 form a cluster 300.

The clusterware software which is executed in computers 310 and 320 to form cluster 300 may be implemented as described in, for example, U.S. Pat. No. 8,732,191 entitled "System And Method For Improving Application Connectivity In A Clustered Database Environment" by Alexander Somogyi, et al. which is incorporated by reference herein in its entirety. One or more components of such clusterware software may be implemented as described in, for example, U.S. Pat. No. 8,849,910 entitled "System And Method For Using Quality of Service With Workload Management in an Application Server Environment" by Rajendra Inamdar, et al. which is incorporated by reference herein in its entirety.

In embodiments of the type shown in FIG. 3E, a command-transmission connection 332 which is used by a client process in computer 310, to send a command and at least a port identifier, to a server process in computer 320, passes through switch 331. Each of computers 310 and 320 additionally include respective network interface cards (NICs) 312 and 322 which are connected to a router 333 (e.g. via another switch, not shown). In such embodiments, driver software which is used to access NIC 312 (FIG. 3E) and which is executed in computer 310 may be associated with port identifier of a listener port, such as port identifier 104 (FIG. 3A), wherein NIC 312 is different from NIC 311, with both NICs 311 and 312 being included in computer 310. Similarly, driver software which is used to access NIC 322 (FIG. 3E) and which is executed in computer 320 may be associated with another port identifier of a connection between server computers, such as port identifier 123 (FIG. 3A) in computer 120 used to connect to computer 130. Router 333 may be additionally connected (via still another switch, also not shown), to another cluster 390.

Cluster 390 (FIG. 3E) includes computers 340, 350 that may respectively implement remote computers 130 and 140 of FIG. 3A. Cluster 390 additionally includes 363 and 364 (FIG. 3E) that may implement additional remote computers. All computers 340, 350, 363 and 364 of cluster 390 are interconnected by switch 361 to storage devices 365. Also, computers 340, 350, 363 and 364 execute clusterware software of the type described above, to share storage devices 365 (FIG. 3E), also connected to switch 331. Files of data stored on storage devices 365 (also called shared storage devices) may include, for example, files of a relational database, e.g. one or more control files, data files, and redo logs.

In an illustrative embodiment, computers 340, 350, 363 and 364 (FIG. 3E) each contain in local memory therein, an instance of software of a relational database management system (RDBMS), and this instance returns, during execution (prior to being stopped, as noted in the third paragraph below), a table of data in the relational database (stored in storage devices 365) in a normal manner, e.g. in response to a query in a structured query language. Binaries of RDBMS software, which is executed by each instance, may be stored locally within each computer, so that corruption of binaries in one computer does not affect operation of any other computer in a cluster. For example, binaries in a storage device (also called dedicated storage device) 343 are used by an RDBMS instance executing in computer 340, and binaries in another storage device (also called dedicated storage device) 353 are used by another RDBMS instance executing in another computer 350. Although instances of RDBMS are described for illustrative embodiments, instances of other applications may be similarly supported in such a cluster 390.

Binaries in a storage device, e.g. storage device 343 may be stored in a predetermined directory, also called "home" directory, which may be specific to a particular vendor of software, such as Oracle® Corporation. For example, in each computer of a cluster, e.g. computer 340, a specific directory in its dedicated storage device, such as device 343 may be selected for use as a home directory for a WebLogic Server, and all files needed for execution of a WebLogic Server instance are then stored in this directory.

When binaries of any software (e.g. RDBMS, or Application Server) need to be updated in cluster 390 (FIG. 3E) with a new version of software, a server process in computer 340 may perform acts of the type described above, in reference to FIG. 3D, e.g. in response to a remotely-executable command with client information (and new version of software) received from a server process in computer 320. The server process in computer 320 in turn may perform acts of the type described above, in reference to FIG. 3C, e.g. in response to a client process in computer 310. More specifically, in such embodiments, a server process in computer 340 copies a new version of the software to computer 350 as per act 224 (FIG. 3D). In act 225, the server process in computer 340 sends to a listener in computer 310, via command-responsive connection 345, output generated by the copying.

Then, as per act 226 (FIG. 3D), the server process in computer 340 sends to a client process in computer 350, one or more steps to be performed to at least partially execute the command. The step(s) may be sent between computers 340 and 350 over a connection 362 that is implemented by clusterware software, to pass through switch 361. Accordingly, computer 350 performs the one or more steps, e.g. at least by stopping an existing instance that executes the earlier version of the software and starting a new instance to execute the new version of the software. Output of computer 350 performing the one or more steps is remotely captured in computer 340 by an act 228 performed by its server process which sends the captured output, via the command-responsive connection 345, to computer 310.

In some embodiments, a client process in client computer 310 (FIG. 3E) is programmed to perform one or more of acts 411-418, as follows. Specifically, in act 411, computer 310 receives user input including a command to be performed remotely and options (e.g. in a command line), in a process that executes client software (i.e. a client process). Thereafter, in act 412, computer 310 validates suitability of the received command and the received options (e.g. checks for syntax, grammar, key words etc). When no errors are found in act 412, the client process goes to act 413 and starts an application server (e.g. starts a TCP listener), by executing server software e.g. in a new thread. Then, in an act 414, the client process extracts an identifier of the TCP port at which the TCP listener is waiting for messages, and also looks up an IP address of the current computer.

Then, in an act 415, the client process sends to a process in computer 320 of the current cluster 300 which executes the server software (same software as in act 413 above), at least: operational information (including name of a command to execute, command line options, identification of cluster 390 and identification of one or more computers therein, e.g. computers 340, 350, 363 and 364), and client information (including TCP listener's port identifier, current computer's IP address, and authentication (e.g. password) if needed by the TCP listener).

Thereafter, in act 416, the client process waits for output to be received, e.g. by the TCP listener via one or more new (command-responsive) connection(s) that are to be set up to the TCP listener's port, including any output of remote execution of the command. This waiting may be done in the new thread, which was started in act 413 (described above). When any output is received, the client process displays the output in act 417. In act 418, the client process waits for a response from the server process in computer 320 in the current cluster 300, indicating completion of command sent thereto.

Figure 4A:
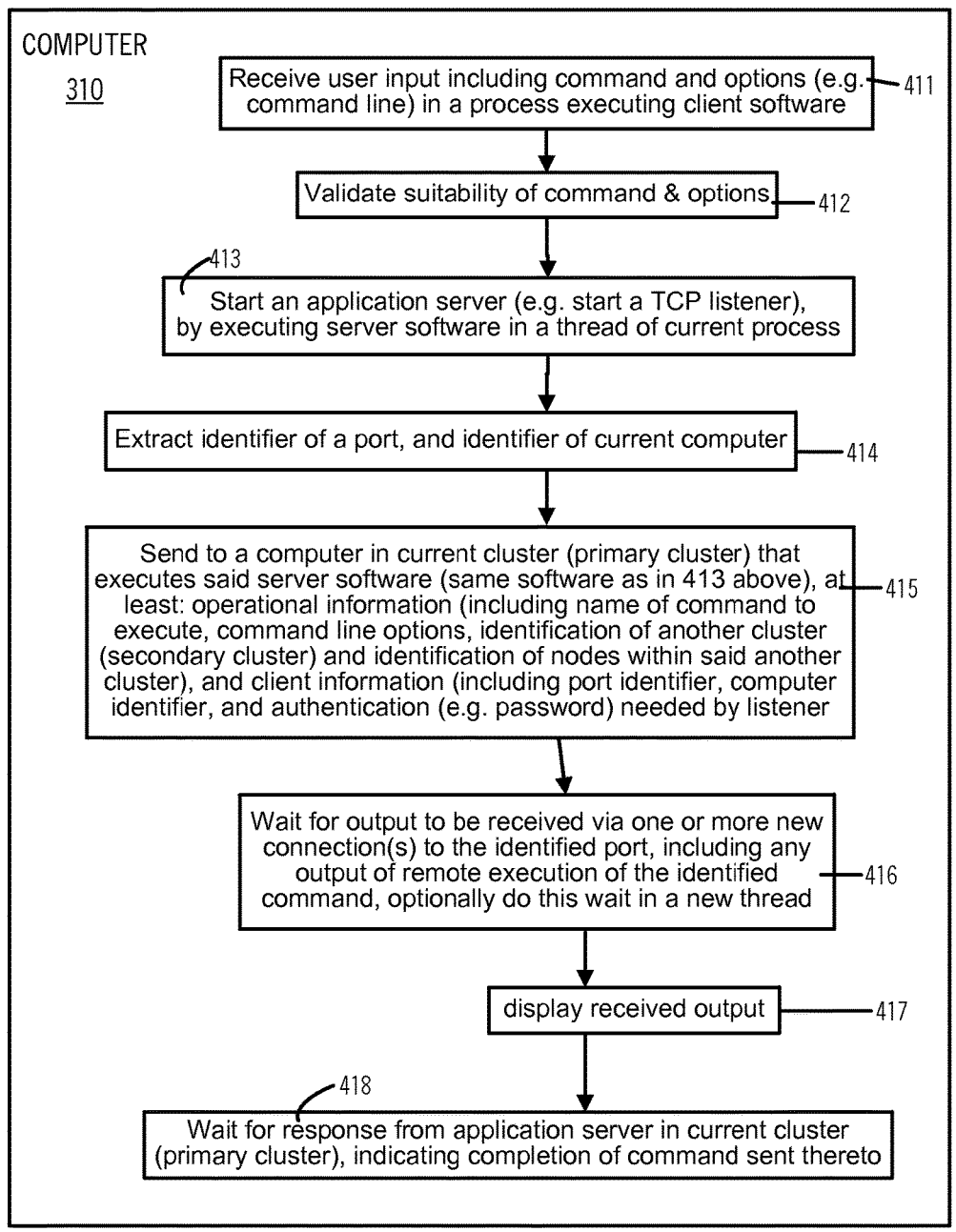
FIG. 4A illustrates, in a flow chart, acts performed by computer 310 of FIG. 3E, in some exemplary embodiments.
Figure 4B:
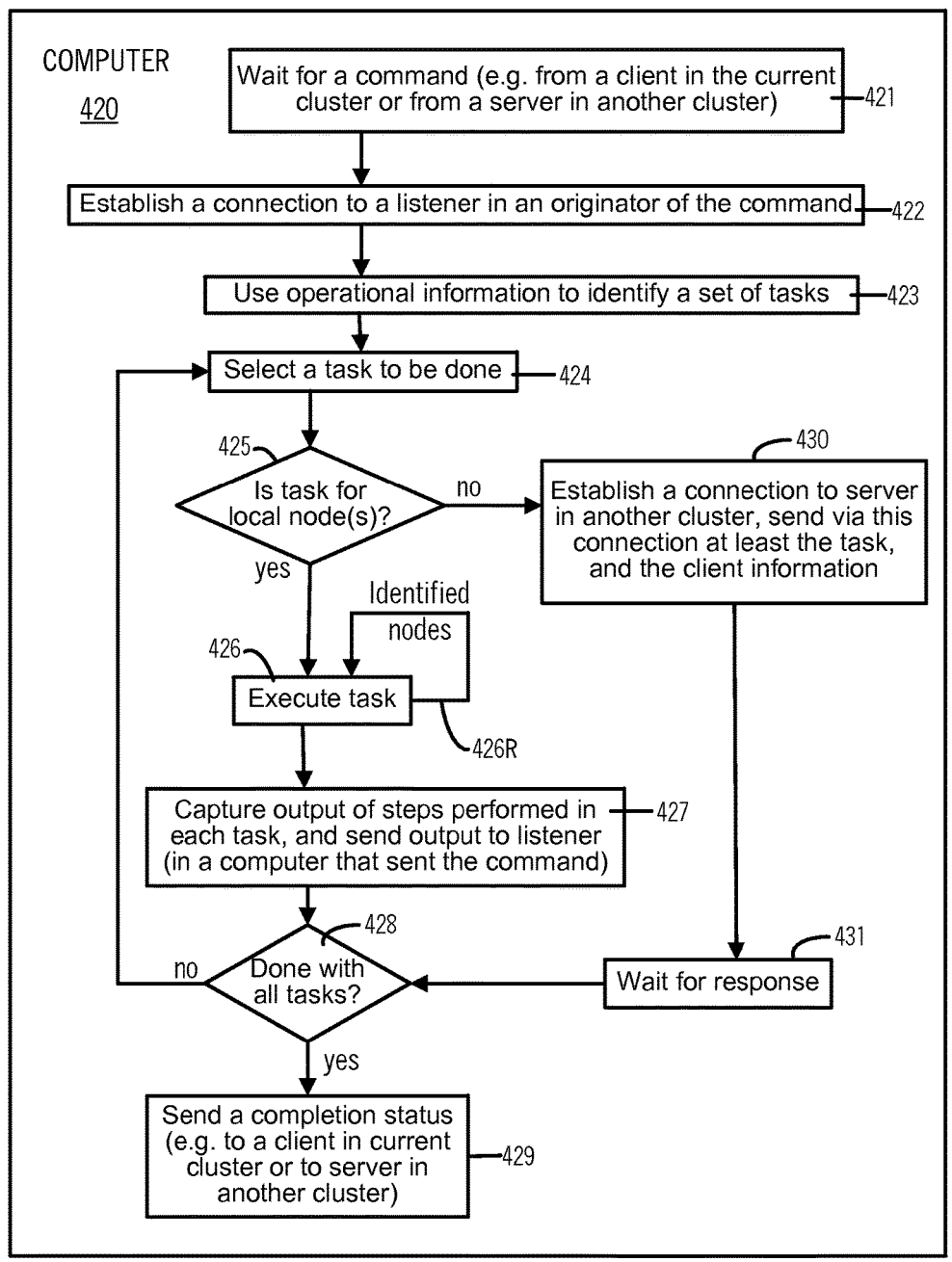
FIG. 4B illustrates, in another flow chart, acts performed by computers 320 and 340 of FIG. 3E, in some exemplary embodiments.

In some embodiments, a server process in server computer 320 or server computer 340 (FIG. 3E) is programmed to perform one or more of acts 421-432, as described below in reference to computer 420 (FIG. 4B). Specifically, in act 421, computer 420 waits to receive a remotely-executable command, e.g. from a client in a local cluster or from a server in another cluster. Then, in act 422, a server process in computer 420 establishes a new connection e.g. to a listener in a computer that originated the remotely-executable command, for use as a command-responsive connection. For example, when a remotely-executable command received from client computer 310, act 422 on being performed in server computer 320, establishes a new connection from a server process in server computer 320 to the listener 103 in client computer 310 (e.g. to a port identified in client information), for use in command reporting. As another example, when a remotely-executable command is received from server computer 320, act 422 on being performed in server computer 340, establishes a new connection from a server process in server computer 340 to a listener in client computer 310 (e.g. to a port identified in client information), for use in command reporting.

Thereafter, in act 423, computer 420 uses operational information (described above) which is received with the command, to identify a set of tasks to be performed, to execute the command. Then in act 424, computer 420 selects a specific task to be performed, e.g. a next unperformed task in a sequence of tasks that may be generated by act 423. Then, computer 420 goes to act 425 to check if the specific task is to be performed by computers that belong to the local cluster, in which computer 420 is a server. For example, computer 320 is a server for computer 310 in cluster 300, hence cluster 300 is the local cluster for computer 320. As another example, computer 340 is a server for computers 350, 363 and 364, and hence cluster 390 is the local cluster for computer 340.

When the answer is yes in act 425, computer 420 goes to act 426 to execute the task, e.g. by sending one or more steps to one or more computers (also called nodes) in its local cluster, similar or identical to steps sent from remote computer 130 to remote computer 140, as illustrated in FIG. 3A and described above. Act 426 may be performed repeatedly, e.g. once for each task and/or once for each identified node. As noted above, one or more nodes may be identified in a command line option which may be received in user input, with a command, by client computer 310, and hence the nodes to execute the tasks may be identified in operational information, which may be sent by server computer 320 to server computer 340.

During execution of one or more tasks in act 426, computer 420 also performs an act 427 to capture output of the one or more steps, and send the output via the command-responsive connection to a listener in client computer 310 (which client computer had originally sent the remotely-executable command). Thereafter, in act 428, computer 420 checks to see if all the tasks have been executed and if not returns to act 424 (described above). In act 425 if the answer is no, computer 420 goes to act 430, and establishes a new connection to another server computer, in another cluster. For example, when act 425 is performed by a server process in computer 320, the remotely-executable command from computer 310 may identify remote computers 350, 363 and 364 as needing to be updated with a new version of software, and in this example, computer 320 determines in act 425 that the task is not for local nodes in cluster 300, and therefore goes to act 430 to establish a new connection to server computer 340 in cluster 390. After establishing a server-server connection in act 430, the server process in computer 420 sends, via the server-server connection, at least the task to be done (selected in act 424) with the client information (received in act 421, with the remotely-executable command). On completion of a task in act 430, the server process in computer 420 receives a response in act 431 and returns to act 428, and when no more tasks are to be done the server process goes from act 428 to act 429.

Note that a server process in computer 340 waits for a remotely-executable command (as per act 421) and on receipt over the server-server connection from computer 320, performs act 422, to set up a command-responsive connection to client computer 310 (as described above). After performing act 422, the server process in computer 304 performs acts 423-428, as just described for computer 420. In act 429, computer 420 sends a completion status, to whichever computer had sent the remotely-executable command to computer 420 (received in act 421). For example, when act 429 is performed by a server process in server computer 340, a completion status is sent to server computer 320, e.g. via a server-server connection over which the remotely-executable command was received in act 421.

Similarly, when act 429 is performed by a server process in server computer 320, a completion status is sent to client computer 310, e.g. via the command-transmission connection over which the remotely-executable command was received in act 421, in certain embodiments wherein the command-transmission connection is kept open until completion of execution of the remotely-executable command.

In some embodiments, a client process in client computer 350 (FIG. 3E) is programmed to perform one or more of acts 441-447 (FIG. 4D), as follows. Specifically, in act 441, computer 350 waits to receive a task to be performed internally therein, in the form of one or more steps sent by a server in the local cluster, e.g. steps may be sent from server 340 via a connection to computer 350. In addition to receiving steps to perform, computer 350 may receive additional information, e.g. client information and/or operational information, depending on the embodiment. In act 442, computer 350 uses the operational information to perform one or more steps (e.g. stop an existing instance in a memory of computer 350). In act 443 of some embodiments, a client process in computer 350 uses client information to open a new connection to a listener in a computer (e.g. computer 310) that originated the command, for use as a command-responsive connection. Then in act 444, the client process sends output (e.g. status of performing a step), over the command-responsive connection, and then goes to act 445. In act 445, computer 350 checks if all steps have been performed, and if not returns to act 442. When all steps are completed, computer 350 goes from act 445 to act 446 and closes the connection opened in act 443, i.e. the command-responsive connection, followed by act 447. In act 447, computer 350 sends a completion status, e.g. via a connection over which steps were received from server 340 (e.g. a server-client connection implemented by an interprocess communication function in clusterware software).

In one specific illustrative embodiment, one or more of acts 411-418 of FIG. 4A are implemented in a command-line tool, called 'rhpctl' that is executed by a process in client computer 310, hereinafter node N1 in cluster 300, hereinafter RHP Server cluster, wherein RHP is an abbreviation for Rapid Home Provisioning. In the just-described specific illustrative embodiment, one or more of acts 421-429 of FIG. 4B are implemented in a server process, hereinafter RHP Server daemon that is executed in server computer 320, hereinafter node N2 in the RHP Server cluster. In the just-described specific illustrative embodiment, one or more of acts 441-447 of FIG. 4C are implemented in another process, hereinafter RHP Client daemon that is executed in server computer 340, hereinafter node NC1 in cluster 390, hereinafter cluster RHPC1. In the just-described specific illustrative embodiment, database software (e.g. software of a relational database management system available from Oracle Corporation) needs to be provisioned on server computer 350, hereinafter node NC2.

In the above-described specific illustrative embodiment, a command may be received, via user input, at node N1 as follows:
$ rhpctl add workingcopy-workingcopy dbwc1-path/u01/app/122/ohome-image DBIMG1-dbname mydb1-node NC2-client RHPC1

In the above-described user input, "add workingcopy" is a command to the rhpctl command-line tool, and strings starting with "-" are command line options. More specifically, in the above-shown example, "-workingcopy dbwc1" is an option, while "-path/u01/app/122/ohome" is another option, and "-image DBIMG1" is yet another option. A logical name "NC2" in the option "-node" above identifies server computer 350 on which one or more steps of the "add working copy" command are to be performed, and logical name "RHPC1" in the option "-client" identifies cluster 390. In several embodiments, client computer 310 lacks information to translate the logical name "NC2" into an IP address (although, as noted below, the logical name may be transmitted to server computer 320, in a command line option received in user input).

In response to receipt of such user input, which constitutes a remotely-executable command of the type described above, a process that executes the rhpctl tool (hereinafter rhpctl process) on node N1 performs the following four actions (i)-(iv). First, in action (i), the rhpctl process in node N1 connects to the RHP Server daemon in node N2, authenticates itself, and sends all command line options to node N2 for further processing. Second, in action (ii), the rhpctl process in node N1 also does the following four steps: (1) starts an internal TCP listener in a separate thread within its process using the ServerSocket class in the JAVA language API set, (2) retrieves the automatic port on which the listener is listening on using the method ServerSocket.getLocalPort( ) of the JAVA API set, (3) retrieves the local host name using the JAVA API InetAddress.getLocalHostQ, (4) combines the local host name (from iii above) and the listening port (from ii above) into a client information unit. Third, in action (iii), the rhpctl process in node N1 sends the client information unit (from 4 above) to the RHP Server daemon in node N2, along with the command line options. Fourth, in action (iv), as an ongoing action, while the command is under execution by the RHP Server daemon in node N2, whenever a message is received on the internal TCP listener, the rhpctl process in node N1 displays the received message to the user terminal, to notify the user of actions being performed.

On node N2, the RHP Server daemon receives the command line options as well as the client information unit, from the rhpctl process on node N1. The RHP Server daemon then performs the following four actions (i)-(iv). First, in action (i), the RHP Server daemon in node N2 creates a writable copy of a specified gold image software, and then connects to the client process executing the rhpctl tool on node N1, using the client information unit that was received, and sends a message saying that node N2 has created a writable copy. Second, in action (ii), the RHP Server daemon in node N2 performs an NFS export action of the writable copy from node N2, and then connects to the 'rhpctl' process on node N1 using the CIP information it received and sends a message saying that it has exported the writable copy filesystem. Third, in action (iii), the RHP Server daemon connects to the RHP Client daemon in node NC1 and sends all of the command line options (or only some of the command line options received from N1, depending on the embodiment) and additional operational information (such as writable copy location, etc) to the RHP Client. It also sends the client information unit to the RHP Client. (Note: the RHP Server daemon knows how to connect to and communicate with RHP Client daemons in other clusters). Fourth, in action (iv) once RHP Server daemon completes action (iii), by sending all necessary information for executing the remotely-executable command to the RHP Client daemon, the RHP Server daemon no longer associates itself with any intermediate communications that may be needed, to perform the remotely-executable command. Instead, the client information unit is used by the RHP Client daemon in node NC1 of cluster RHPC1, to communicate directly with the 'rhpctl' process on node N1 of cluster RHPS, without involving the RHP Server daemon in node N2.

On node NC1, the RHP Client daemon receives command line options, and operational information (such as writable copy location, etc) and also the client information unit. The RHP Client daemon then performs the following six actions (i)-(vi). First, in action (i), the RHP Client daemon mounts the writable copy using NFS protocol exported by the RHP Server daemon from the cluster RHPS. Next, the RHP Client daemon connects to the 'rhpctl' process on node N1 using the client information unit it received and sends a message saying that it has mounted the writable copy filesystem on node NC1. Second, in action (ii), the RHP Client daemon kicks off a 'transfer' command to copy the Oracle Database software that was made available on this node NC1 after the mount action in (i) above. The RHP Client daemon also passes the client information unit to this command. Third, in action (iii), the RHP Client daemon executes the 'transfer' command to perform a copy of the entire database software from the mounted filesystem to the Oracle Home directory path, specified by user input received as a command line option. This action is performed in parallel on all the nodes of cluster RHPC1 so that the database software is available on the nodes when needed in future. This action involves copying several gigabytes of data and could take some time. Fourth, in action (iv), the RHP Client daemon continues to execute the 'transfer' command by connecting to the 'rhpctl' process on node N1 using the client information unit it received and sends several messages indicating the progress of the copy operation being performed, as described next. Fifth, in action (v), the RHP Client daemon runs the 'clone' command to relink all binaries on each of the copies of the Oracle database software home. In this step, about 1 gigabyte of files get created and could take some time. All of the output of the 'clone' command is sent to the user via the 'rhpctl' process on node N1 by connecting to its listener directly and communicating to it using the client information unit. Sixth, in action (vi), the RHP Client daemon executes the 'dbca' command on node NC2, and while that is executing, capture its live output. In addition, the RHP Client daemon uses the client information unit to send this live output back to the 'rhpctl' process running on node N1 on cluster RHPS.

Thus, in the above-described example, client information is sent in a unit of data, to the following commands/processes on the respective nodes, and they use the client information unit to directly communicate with the process executing the 'rhpctl' command at originating node N1, without needing to involve any of the intermediate nodes N2, NC1 etc as follows. First, the client information unit is used by the RHP Server daemon running on node N2 on Cluster RHPS. Second, the client information unit is used by the RHP Client daemon running on node NC1 on Cluster RHPC1. Third, the client information unit is used by a 'transfer' command running on node NC1 on Cluster RHPC1. Fourth, the client information unit is used by a 'clone' command (through an agent process) running on node NC2 on Cluster RHPC1. Fifth, the client information unit is used by a 'dbca' command (through an agent process) running on node NC2 on Cluster RHPC1.

Figure 5A:
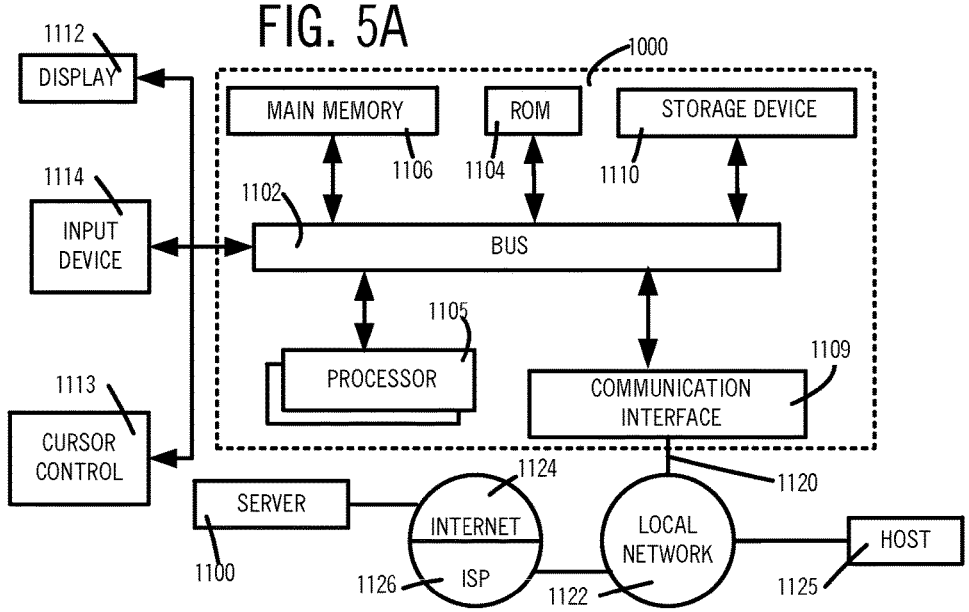
FIGS. 5A and 5B illustrate, in block diagrams, hardware and software portions of one or more computers that perform the methods illustrated in FIGS. 3B, 3C, 3D, 4A, 4B and 4C in some embodiments.

The methods of FIGS. 3B-3D and/or FIGS. 4A-4C may be used to program one or more computer(s) 1000 each of which may be implemented as illustrated in FIG. 5A which is discussed next. Specifically, computer 1000 includes a bus 1102 (FIG. 5A) or other communication mechanism for communicating information, and one or more processor(s) 1105 coupled with bus 1102 for processing information. Computer 1000 uses (as the above-described memory) a main memory 1106, such as a random access memory (RAM) or other dynamic storage device, coupled to bus 1102 for storing information and instructions (e.g. to perform the acts of FIGS. 2B-2D and/or FIGS. 4A-4C) to be executed by processor 1105.

Main memory 1106 (FIG. 5A) also may be used for storing temporary variables or other intermediate information during execution of instructions to be executed by processor 1105. Computer 1000 further includes a read only memory (ROM) 1104 or other static storage device coupled to bus 1102 for storing static information and instructions for processor 1105, such as software in the form of clusterware software, application server software, and/or relational database management system (RDBMS) software. A storage device 1110, such as a magnetic disk or optical disk, is provided and coupled to bus 1102 for storing information and instructions.

Computer 1000 (FIG. 5A) may be coupled via bus 1102 to a display device or video monitor 1112 such as a cathode ray tube (CRT) or a liquid crystal display (LCD), for displaying information to a computer user (e.g. a store manager) may be displayed on display 1112. An input device 1114, including alphanumeric and other keys (e.g. of a keyboard), is coupled to bus 1102 for communicating information (such as user input) to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112, computer 1000 may include a speaker (not shown) as another output device for use by processor 1105.

As described elsewhere herein, a software provisioning system may be implemented by computer 1000 (FIG. 5A) in response to processor 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to perform the operations of a process described herein and illustrated in FIGS. 2B-2D and/or FIGS. 4A-4C. In alternative embodiments, hard-wired circuitry may be used in place of or in combination with software instructions.

The term "non-transitory computer-readable storage medium" as used herein refers to any non-transitory storage medium that participates in providing instructions to processor 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computer 1000. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a computer. Such a computer can load the instructions into its dynamic memory (RAM) and send the instructions over a telephone line using a modem.

A modem local to computer 1000 (FIG. 5A) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer 1000 (FIG. 5A) also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 (FIG. 5A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer 1000, are exemplary forms of carrier waves transporting the information.

Computer 1000 (FIG. 5A) can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The instructions for performing the operations or acts of FIGS. 4A-4D and FIG. 1F may be executed by processor 1105 as they are received, and/or stored in storage device 1110, or other non-volatile storage for later execution. In this manner, computer 1000 may additionally or alternatively obtain instructions and any related data in the form of a carrier wave.

Figure 5B:
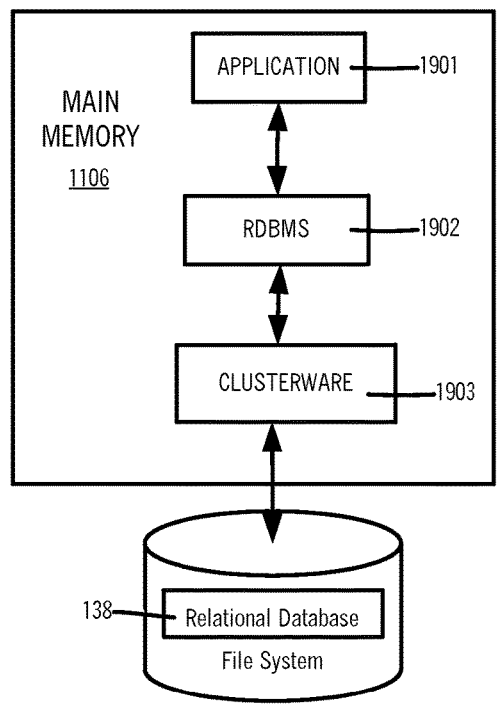

Note that FIG. 5A is a very low-level representation of many hardware components of a computer system. Several embodiments have one or more additional software components in main memory 1106 as shown in FIG. 5B. In addition to main memory 1106, computer 1000 may include one or more other types of memory such as flash memory (or SD card) and/or a hard disk and/or an optical disk (also called "secondary memory") to store data and/or software for loading into memory 1106 (also called "main memory") and/or for use by processor(s) 1105. In some embodiments, computer 1000 of FIG. 5A implements a relational database management system 1902 to manage data in one or more tables of a relational database 138 of the type illustrated in FIG. 5B. Such a relational database management system 1902 may manage a distributed database system that includes multiple databases, each table being stored on different storage mechanisms.

In some embodiments, processor 1105 that executes software of an application 1901 can access and modify the data in a relational database 138 via clusterware 1903 and RDBMS 1902. RDBMS 1902 accepts queries in conformance with a relational database language, the most common of which is the Structured Query Language (SQL). The commands are used by processor 1105 of some embodiments to store, modify and retrieve data about an application program in the form of rows in a table in relational database 138. Relational database management system 1902 further includes output logic that makes the data in a database table available to a user via a graphical user interface that generates a screen of application 1901 on a video monitor display 1112. In one example, the output logic of computer 1000 provides results on a monitor or other such visual display, via a command line interface. Additionally and/or alternatively, screens responsive to a command in a command-line interface and display on a video monitor may be generated by computer 1000.

In some embodiments of computer 1000, functionality in the above-described operations or acts of FIGS. 2B-2D and/or FIGS. 4A-4C is implemented by processor 1105 executing software in memory 1106 of computer 1000, although in other embodiments such functionality is implemented in any combination of hardware circuitry and/or firmware and/or software in computer 1000. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 2B-2D and/or FIGS. 4A-4C can, but need not necessarily include, one or more microprocessors, embedded processors, controllers, application specific integrated circuits (ASICs), digital signal processors (DSPs), multi-core processors and the like.

Any non-transitory computer readable medium tangibly embodying software (also called "computer instructions") may be used in implementing one or more acts or operations described herein and illustrated in FIGS. 2B-2D and/or FIGS. 4A-4C. Such software may include program codes stored in memory 1106 and executed by processor 1105. Memory 1106 may be implemented within or external to processor 1105, depending on the embodiment. When implemented in firmware and/or software, logic to perform one or more acts or operations of FIGS. 2B-2D and/or FIGS. 4A-4C may be stored as one or more computer instructions or code on a non-transitory computer-readable medium.

In some embodiments, a computer 1000 may include multiple processors, each of which is programmed with software in a memory 1106 shared with each other to perform acts of the type described above to implement individual commands. For example, a first processor 1105 in computer 1000 may be programmed with software in memory 1106 to implement the 'transfer' command. A second processor 1105 in computer 1000 may be programmed with software in memory 1106 to implement the 'clone' command. A third processor 1105 in computer 1000 may be programmed with software in memory 1106 to implement the 'dbca' command.

Although three processors 1105 have been just described for some embodiments to implement the respective commands, in other embodiments a single processor 1105 may be used in a time shared manner to implement the just-described commands of the previous paragraph. Furthermore, in still other embodiments, one processor 1105 may be used in a time-shared manner to implement one or more parts of various commands. Furthermore, although processors 1105 have been described above for certain embodiments as being included in a single computer 1000, in other embodiments multiple such processors 1105 may be included in multiple computers 1000, for example three computers 1000 may implement the three commands described above. Additionally, in one or more such embodiments, one or more processor(s) 1105 with a bus 1103 implement the 'rhpctl' command in computer 100.

Thus, one or more computers in several embodiments of the type described herein are programmed to implement a method of transmitting commands, wherein a client process, which executes client software in a first computer, uses a port identifier in the first computer to form a connection to a first server process in a second computer, the client process starting execution in the first computer, of listener software that waits to receive messages using another port identifier ("listener port identifier") in the first computer, the client process retrieving from memory, the listener port identifier, the client process sending via the connection only to the first server process, at least a command and the listener port identifier, and optionally an identifier of the first computer, and thereafter the first computer receiving during execution of the listener software, one or more messages using the listener port identifier, from a second server process different from the first server process, wherein the one or more messages are related to the command (e.g. output of execution of the command, in any computer in which the second server process executes), and wherein the client process has no information on how to access the second server process before receipt of the one or more messages. Although a connection is used in some embodiments of the type just described, to send a command and a listener port identifier from the client process only to the first server process, in alternative embodiments the command and listener port identifier may be sent from the client process only to the first server process using a connectionless protocol. Moreover, in embodiments of the type just described, a command, a listener port identifier, and an identifier of a computer (wherein a client process that originated the command executes) may be sent from a first server process to a second server process using either a connection-oriented protocol or a connectionless protocol, depending on the embodiment. Furthermore, a second server process may use the listener port identifier to directly send remotely-originated information only to the client computer, using a connection-oriented protocol or a connectionless protocol, without involving the first server process (or any other intermediate server process).

Numerous modifications and adaptations of the embodiments described herein will become apparent to the skilled artisan in view of this disclosure. Numerous modifications and adaptations of the embodiments described herein are encompassed by the attached claims.

The invention claimed is:

1. A computer-implemented method of transmitting commands, the computer-implemented method comprising:
   a client process in a first computer sending to a first server process in a second computer, one or more first messages comprising at least two port identifiers in the first computer, the one or more first messages comprising one or more first headers, the one or more first headers comprising a first port identifier in the first computer, the one or more first messages further comprising one or more first payloads, the one or more first payloads comprising a command, and a second port identifier in the first computer at which listener software executing in the first computer waits to receive messages, the one or more first messages being sent from a first port identified by the first port identifier in the first computer to the second computer; and
   receiving in the first computer, at a second port identified by the second port identifier in the one or more first payloads which is different from the first port, from a third computer in which executes a second server process different from the first server process, one or more second messages, the one or more second messages comprising one or more second headers, the one or more second headers comprising the second port identifier in a destination port field, the one or more second messages further comprising one or more second payloads, the one or more second payloads comprising information responsive to the command.

2. The computer-implemented method of claim 1 wherein:
   the information in the one or more second payloads of the one or more second messages, received in the first computer at the second port identified by the second port identifier, is related to execution of the command in the third computer.

3. The computer-implemented method of claim 1 wherein:
   the one or more first messages are sent via a connection from the first computer to the second computer;
   the third computer at least partially executes the command; and
   the third computer sends directly to the first computer without involving the second computer, via a new connection to the second port different from the first port, at least an output generated by at least partial execution of the command, in said information in the one or more second payloads of said one or more second messages.

4. The computer-implemented method of claim 3 wherein:
   in the at least partial execution of the command, the third computer copies a new version of any software to a fourth computer;
   the third computer sends to the fourth computer, additional information for use in an act to be performed to at least partially execute the command; and
   the fourth computer performs the act at least by stopping an existing instance that executes an earlier version of said any software and starting a new instance to execute the new version of said any software.

5. The computer-implemented method of claim 1 wherein the first server process executes an earlier version of server software, and wherein the command comprises:
   an instruction to start in the second computer, a new server process to execute a new version of the server software, using as input thereto the second port identifier and an identifier of the first computer; and
   another instruction to kill the first server process in the second computer.

6. The computer-implemented method of claim 1 wherein:
   the client process in the first computer receives an error indicative of loss of a connection from the first port in the first computer to the first server process in the second computer; and
   at least in response to receipt of the error, the client process retrieves from memory, said information received via a new connection to the second port in the first computer, in the one or more second payloads of the one or more second messages.

7. The computer-implemented method of claim 1 wherein:
   the client process sends via a connection from the first port in the first computer only to the first server process in the second computer, at least the command and the second port identifier in the one or more first messages; and
   the one or more second messages are received in the first computer at the second port via a new connection directly from the third computer without involving the second computer.

8. The computer-implemented method of claim 1 wherein:
   the client process has no information on how to access the second server process, prior to receipt of the one or more second messages via a new connection directly from the third computer without involving the second computer, from the second server process which executes in the third computer.

9. The computer-implemented method of claim 1 further comprising:
   starting execution of the listener software which waits to receive messages at the second port, by the client process which sends the second port identifier of the second port in the one or more first payloads of the one or more first messages sent from the first port.

10. The computer-implemented method of claim 1 wherein:
    the listener software, which waits to receive messages at the second port, executes in a thread or process different from the client process, which sends the second port identifier of the second port in the one or more first payloads of the one or more first messages sent from the first port.

11. The computer-implemented method of claim 10 further comprising:
    transferring, via a shared area of memory in the first computer, the one or more second payloads of the one or more second messages received at the second port by the listener software, to the client process which sends from the first port, the second port identifier of the second port in the one or more first payloads of the one or more first messages.

12. The computer-implemented method of claim 1 further comprising:
    the second server process in the third computer receiving from the first server process in the second computer, an identifier of the first computer and the second port identifier of the second port in the first computer at which the listener software waits to receive messages.

13. The computer-implemented method of claim 1 wherein:
the one or more second payloads of the one or more second messages received at the second port by the listener software from the third computer comprise a new command to be executed by the first computer.

14. The computer-implemented method of claim 1 wherein:
the one or more first payloads, which comprise the command and the second port identifier, further comprise one or more command line options.

15. One or more non-transitory computer-readable storage media comprising software executable by one or more processors, the software comprising instructions which when executed at least cause:
a client process in a first computer to send to a first server process in a second computer, one or more first messages comprising at least two port identifiers in the first computer, the one or more first messages comprising one or more first headers, the one or more first headers comprising a first port identifier in the first computer, the one or more first messages further comprising one or more first payloads, the one or more first payloads comprising a command, and a second port identifier in the first computer at which listener software executing in the first computer waits to receive messages, the one or more first messages being sent from a first port identified by the first port identifier in the first computer to the second computer; and
the first computer to receive, at a second port identified by the second port identifier in the one or more first payloads which is different from the first port, from a third computer in which executes a second server process different from the first server process, one or more second messages, the one or more second messages comprising one or more second headers, the one or more second headers comprising the second port identifier in a destination port field, the one or more second messages further comprising one or more second payloads, the one or more second payloads comprising information responsive to the command.

16. The one or more non-transitory computer-readable storage media of claim 15 wherein the instructions when executed further cause:
starting execution of the listener software which waits to receive messages at the second port, by the client process which sends the second port identifier of the second port in the one or more first payloads of the one or more first messages sent from the first port.

17. The one or more non-transitory computer-readable storage media of claim 15 wherein:
the listener software, which waits to receive messages at the second port, executes in a thread or process different from the client process, which sends the second port identifier of the second port in the one or more first payloads of the one or more first messages sent from the first port.

18. A system comprising a memory that stores software to transmit commands, and one or more processors coupled to the memory to execute the software, the software comprising instructions which when executed at least cause:
a client process in a first computer to send to a first server process in a second computer, one or more first messages comprising at least two port identifiers in the first computer, the one or more first messages comprising one or more first headers, the one or more first headers comprising a first port identifier in the first computer, the one or more first messages further comprising one or more first payloads, the one or more first payloads comprising a command, and a second port identifier in the first computer at which listener software executing in the first computer waits to receive messages, the one or more first messages being sent from a first port identified by the first port identifier in the first computer to the second computer; and
in the first computer to receive, at a second port identified by the second port identifier in the one or more first payloads which is different from the first port, from a third computer in which executes a second server process different from the first server process, one or more second messages, the one or more second messages comprising one or more second headers, the one or more second headers comprising the second port identifier in a destination port field, the one or more second messages further comprising one or more second payloads, the one or more second payloads comprising information responsive to the command.

19. A computer-implemented method of transmitting commands, the computer-implemented method comprising:
a first server process, which executes server software in a first computer, receiving from a first port in a second computer, one or more first messages, the one or more first messages comprising one or more first headers, the one or more first headers comprising a first port identifier of the first port in the second computer, the one or more first messages further comprising one or more first payloads, the one or more first payloads comprising a command and a second port identifier in the second computer;
the first server process transmitting to a second server process executing in a third computer, at least the command, the second port identifier, and an identifier of the second computer; and
the second server process transmitting one or more second messages to listener software waiting to receive messages at a second port in the second computer which is different from the first port, the second port being identified by the second port identifier in the one or more first payloads of the one or more first messages received from the first port, the one or more second messages comprising one or more second headers, the one or more second headers comprising the second port identifier in a destination port field, the one or more second messages further comprising one or more second payloads, the one or more second payloads comprising information responsive to the command.

20. The computer-implemented method of claim 19 further comprising:
the first server process receiving an identifier of the third computer from a client process in the second computer.

21. One or more non-transitory computer-readable storage media comprising software executable by one or more processors, the software comprising instructions which when executed at least cause:
a first server process, which executes server software in a first computer, to receive from a first port in a second computer, one or more first messages, the one or more first messages comprising one or more first headers, the one or more first headers comprising a first port identifier of the first port in the second computer, the one or more first messages further comprising one or more first payloads, the one or more first payloads comprising a command and a second port identifier in the second computer;

the first server process to transmit to a second server process executing in a third computer, at least the command, the second port identifier, and an identifier of the second computer; and the second server process to transmit one or more second messages to listener software waiting to receive messages at a second port in the second computer which is different from the first port, the second port being identified by the second port identifier in the one or more first payloads of the one or more first messages received from the first port, the one or more second messages comprising one or more second headers, the one or more second headers comprising the second port identifier in a destination port field, the one or more second messages further comprising one or more second payloads, the one or more second payloads comprising information responsive to the command.

\* \* \* \* \*

UNITED STATES PATENT AND TRADEMARK OFFICE
CERTIFICATE OF CORRECTION

| | | |
|---|---|---|
| PATENT NO. | : 10,140,121 B2 | Page 1 of 1 |
| APPLICATION NO. | : 14/805428 | |
| DATED | : November 27, 2018 | |
| INVENTOR(S) | : Ravindhran et al. | |

It is certified that error appears in the above-identified patent and that said Letters Patent is hereby corrected as shown below:

In the Specification

In Column 19, Line 23, delete "InetAddress.getLocalHostQ," and insert
-- InetAddress.getLocalHost(), --, therefor.

In the Claims

In Column 28, Line 9, in Claim 18, before "the first computer" delete "in".

Signed and Sealed this
Seventeenth Day of December, 2019

Andrei Iancu
*Director of the United States Patent and Trademark Office*